United States Patent [19]

Porter

[11] 3,882,286

[45] May 6, 1975

[54] TELEPHONE SWITCHING SYSTEM

[75] Inventor: Virgle E. Porter, Steger, Ill.

[73] Assignee: Amtron, Inc., Midlothian, Ill.

[22] Filed: May 8, 1973

[21] Appl. No.: 358,465

[52] U.S. Cl. .......... 179/18 GF
[51] Int. Cl. .......... H04q 1/52
[58] Field of Search .......... 179/186 F, 18 GF, 18 BG

[56] References Cited

UNITED STATES PATENTS

| | | | |
|---|---|---|---|
| 2,949,506 | 8/1960 | Abbott et al. | 179/27 B |
| 3,118,973 | 1/1964 | Kasper et al. | 179/186 F |
| 3,204,038 | 8/1965 | Seeman et al. | 179/186 F |
| 3,452,159 | 6/1969 | Vande Wege | 179/27 DA |
| 3,557,317 | 1/1971 | Porter | 179/27 F |
| 3,584,155 | 6/1971 | Koster | 179/27 DA |
| 3,786,194 | 1/1974 | Pinede et al. | 179/18 AD |

*Primary Examiner*—Kathleen H. Claffy
*Assistant Examiner*—C. T. Bartz
*Attorney, Agent, or Firm*—Hume, Clement, Brinks, Willian, Olds & Cook, Ltd.

[57] ABSTRACT

There is disclosed an improved telephone switching system which in the preferred embodiment comprises a private branch exchange (PBX). The improved telephone switching system includes a crosspoint matrix of horizontal and vertical terminal dimensions N × M, respectively, with the matrix crosspoint at the intersection of respective horizontal and vertical terminal pairs being adapted for effecting an electrical interconnection of said respective terminal pairs in response to coincident signal markings thereon and further having N termination circuits and M normally idle link circuits coupled to individual ones of said horizontal and vertical terminals, respectively, of said matrix. A plurality of Z registers are associated with the link circuits. Several automatic features are provided by the telephone switching system through the use of common circuitry associated with the registers. Heretofore, these automatic features required individual circuits to be associated with each termination and in certain instances, these automatic features have heretofore not been provided.

39 Claims, 18 Drawing Figures

TELEPHONE SWITCHING SYSTEM

BACKGROUND OF THE INVENTION

The present invention relates generally to telephone switchboards and more particularly to a highly automated private branch exchange that provides several automatic features which may be completed without attendant assistance.

The telephone switching system of the present invention serves to connect a termination which may either be a line circuit or a trunk circuit to a second termination which may also be a line circuit or a trunk circuit. In addition to this basic operation, the telephone switching system of the preferred embodiment, provides for conference calls with up to five stations, conference calls between an outside line and up to four inside stations, outside line call transfer and retransfer functions, outside line call holding while consulting with any other station and then reconnecting to the original outside call, and outside line with station camp-on. In addition, the present invention provides for classifications in each of the terminations to act as a toll restriction for assignment of night numbers, for unassigned night answer, and for direct inward trunk access to the several stations. The majority of these operations may be accomplished without the need for an attendant. The circuitry for the direct inward trunk axis, the toll restriction, the assigned night number, the unassigned night answer, and the conference calls, are common circuits associated with the registers and links of the telephone switching system of the preferred embodiment.

While many of these features from a functional standpoint have heretofore been available, the circuitry employed in the present invention differ greatly. In the prior art devices, it was normally necessary to utilize a separate circuit for each of these functions and these circuits were associated with individual terminations and thus had to be multiplied for the total number of terminations in the switching system. In the present invention, one circuit is designed for each of the functions to be performed and this circuit is associated with the registers and links rather than with the terminations as done in the prior art.

SUMMARY OF THE INVENTION

The general purpose of this invention is to provide an improved telephone switching system which provides many of the automatic features heretofore available as well as additional automatic features heretofore unavailable by utilizing a minimum number of components. To attain this, the present invention contemplates a telephone switching system having a crosspoint matrix of horizontal and vertical terminal dimensions N by M respectively with the matrix crosspoint at the intersection of respective horizontal and vertical terminal pairs being adapted for effecting an electrical interconnection of the respective terminal pairs in response to coincident signal markings thereon and further having N termination circuits and M normally idle link circuits coupled to individual ones of the horizontal and vertical terminals respectively of the matrix. In combination, the telephone switching system utilizes a plurality of register circuits associated with the link circuits. A scanner circuit is provided for signal marking the horizontal terminal of a first predetermined member of the N termination circuits. An allotter circuit enables one of the M link circuits to signal mark its associated vertical matrix terminal and to complete an electrical connection to the horizontal terminal of the first predetermined member of the N termination circuits. One of the Z register circuits in response to the link circuit signal mark is electrically connected to the selected link and supplies a dial tone to the predetermined member of the N termination circuits to enable the predetermined member of the N termination circuits to dial, whereby the connected register circuit is then responsive to the dialing. A first control circuit connects each of the N termination circuits to each of the M link circuits whereby the connected register circuit energizes the first control circuit associated with a second predetermined member of the termination circuits in response to the dialing thereby signal marking the horizontal terminal of the second predetermined member of the N termination circuits whereby the second predetermined member of the N termination circuits is connected to the first predetermined member of the N termination circuits through the previously connected matrix terminal.

In addition to the above basic configuration, a second control circuit is provided to connect each of the link circuits to each of the N termination circuits wherein the second control circuit is adapted to supply individual identification data relating to each of the N termination circuits to the M link circuits. This identification data may be then utilized to form several of the automatic features provided by the improved telephone switching system.

It is therefore an object of the present invention to provide an improved telephone switching system which utilizes a minimum number of components and which eliminates the need for having special component circuits connected to each individual termination circuit.

Another object is to provide the telephone switching system wherein certain termination circuits may be toll restricted.

A further object is to provide a telephone switching system wherein a plurality of terminations may be connected together to form a conference connection.

Still another object is to provide a telephone switching system wherein an inward trunk call may be disconnected from a local telephone and wherein the local telephone may connect itself to a second local telephone and then reconnect itself to the inward trunk call.

Still another object is to provide a telephone switching system providing camp-on functions.

Yet another object is the provision of a telephone switching system wherein the inward call may be connected directly to a local telephone without attendant assistance.

A still further object is to provide a telephone switching system wherein a given trunk or group of trunk circuits may be automatically connected to a given line circuit in such a manner that the given line circuit may still be utilized to call other local line circuits.

A still further object is the provision of a telephone switching system wherein multi-line phones may be connected to a plurality of termination circuits without the use of an interface circuit.

A still further object is the provision of a telephone switching system wherein certain terminations may be restricted as to the type of call that may be made.

A still further object is the provision of a telephone switching system wherein certain terminations may be connected to other terminations only by an attendant.

A still further object is the provision of an improved circuit for generating no arc ring control and ring signal.

A still further object of the invention is to provide an improved busy detector.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
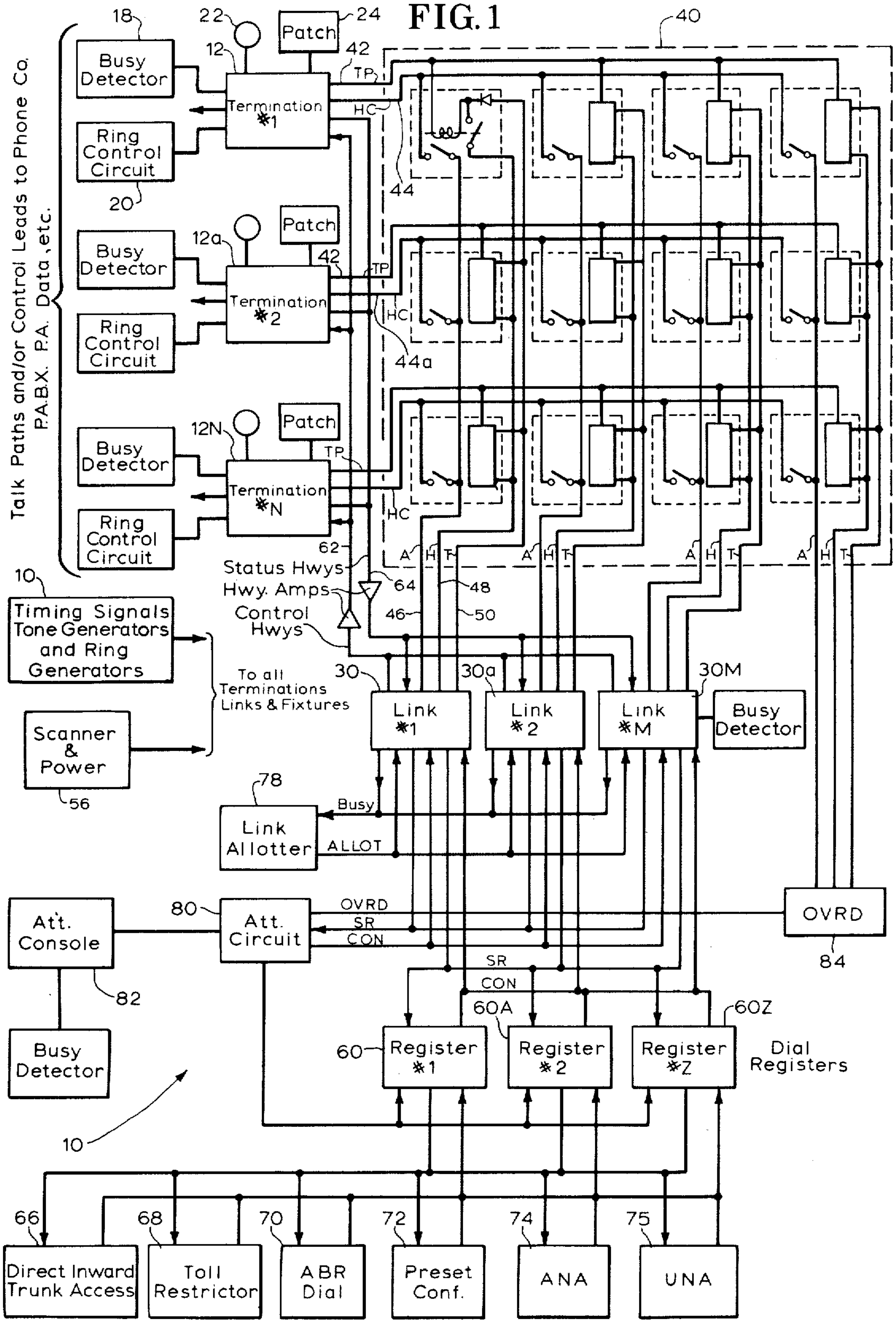
FIG. 1 is a block diagram of a preferred embodiment of the invention.

Referring now to the drawings wherein like reference characters designate like or corresponding parts throughout the several views, there is shown in FIG. 1, which constitutes the preferred embodiment of the invention, an improved telephone switching system 10 which will hereinafter be referred to as a private branch exchange 10 (PBX). It will be recognized however, that the teachings of the present invention need not be limited to a PBX but may be applied to telephone switching systems in general.

The illustrated PBX 10 is adapted to be attended by an attendant but as will be generally evident below, it may be modified to be used without an attendant. The general overall functional configuration of the PBX 10 is very similar to the manual telephone switchboard disclosed in U.S. Pat. No. 3,557,317 issued to Virgle E. Porter on Jan. 19, 1971. The major difference between the present PBX 10 and the manual telephone switchboard disclosed in the aforementioned patent relates to the automatic features which are present in the PBX 10 and which are not present in the manual telephone switchboard. However, it will be recognized that certain features are common to both the PBX 10 and to the manual telephone switchboard disclosed in said aforementioned patent and therefore, these features will not be explained in great detail.

As shown in FIG. 1, the PBX 10 is adapted to be used with a plurality of terminations 12 through 12N where N is any positive integer. As will become readily apparent, the terminations 12 are conventional terminations and may comprise both trunk circuits, line circuits and public address circuits. For example, several types of trunk circuits may be utilized such as inter-connect trunk circuits, E and M trunk circuits, and ground/loop start trunk circuits. The terminations may also comprise conventional line circuits which would be connected to individual telephone receivers or other suitable equipment located on the premises of the PBX. Finally, the terminations may also comprise conventional public address circuits. In the preferred embodiment, the PBX 10 is designed to utilize sixty-four terminations which may be a mixture of any line circuits, trunk circuits and/or public address circuits as determined by the particular circuitry utilized. However, it will be recognized that any number of terminations may be utilized with suitable design modifications.

The representative termination circuit is either connected to the central office if it is a trunk circuit, or to an associated telephone, through a bilateral talk path such as a balanced line pair, schematically denoted by the oppositely directed arrows 16 in the drawing. Each termination circuit, includes a busy detector circuit 18, a ring control circuit 20, a busy lamp 22, and a patch circuit 24.

The PBX 10 also includes a pluraity of links 30, through 30M, where M is any positive integer. For clarity, only three such links are shown; however, it will be recognized that any number of links may be utilized. The links are utilized to complete a call between any two terminations through a conventional crosspoint matrix 40. The crosspoint matrix 40 is of conventional construction having N horizontal and M vertical terminals coupled to individual ones of the terminations 12 through 12N. As is well understood in the prior art, there is usually an open circuit at each horizontal and vertical terminal intersection, i.e., matrix crosspoint, but in response to coincident signal markings on a horizontal and a vertical matrix terminal, the crosspoint contacts at the intersection of these points are closed and an electrical circuit is completed through the matrix to electrically connect a link and a termination. In the present embodiment, each horizontal terminal, as for example, that coupled to termination 12 comprise a pair of electrical conductive leads 42 and 44. Lead 42 may be considered the talk path and lead 44 may be considered the horizontal control lead. Each vertical matrix terminal includes three electrically conductive leads such as the leads 46, 48 and 50, which are coupled to the link 30. Thus, the expressions "horizontal terminal" and "vertical terminal" as used herein as well as in the appended claims are intended to generally denote any groupings of one or more electrical leads that cooperatively define the horizontal and vertical inputs, respectively, to a matrix crosspoint element. Of course, the words "horizontal" and "vertical" as used in the present context are well-known terms of art defined in a convenient reference frame, and these words are not to be interpreted as specified in the relative or absolute angular orientation of the terminals.

The crosspoint matrix 40 is identical to the crosspoint matrix described in the aforecited patent issued to Virgle E. Porter. Briefly, the matrix crosspoint is adapted to selectively interconnect the termination 12 to the link 30 and is represented within the dashed outline 52 in the drawing of FIG. 1. The apparatus enclosed by the dashed block 52 is typically contained within a singular modular glass reed switch of conventional construction. Each of the remaining crosspoints of the matriix is likewise comprised of a similar reed switch unit. More specifically, the matrix crosspoint switch assembly 52 comprises a pair of normally open contacts 52*a* and 52*b* adapted to be closed upon the energization of the coil 52*c*, as is noted in the drawing by the dashed line joining the coil and switch contacts. The switch contact 52*a* is interposed between a horizontal talk path lead 42 of the termination 12 and a vertical talk path lead 50 of a line 30; closure of the contact 52*a* provides an electrically conductive "talk path" between the aforesaid link and termination.

Closure of the crosspoint contacts 52*a* occurs only in the presence of coincident signal markings on the horizontal control hold current lead 44 and the vertical control lead 46 resulting in a current flow from the termination 12 through the lead 44, the coil 52*c*, a blocking diode 52*d*, and the vertical matrix lead 46 to ground. This current flow energizes the coil 52*c*, closing the contacts 52*a* and 52*b*. A hold current lead 48, closed contact member 52*b*, the energizing coil 52*c*, and the control hold current lead 44, to the termination 12 to maintain the talk path contact 52*a* in a closed position. A call is terminated by momentarily interrupting the hold current path for the coil 52*c* which in turn causes the contacts 52*a* and 52*b* to open and terminate the talk path connection between the termination 12 and the link 30. Signal marking of the horizontal matrix terminals associated with each termination is affected by the telephone user picking up the receiver and will be explained below.

The link circuits 30 through 30M are similar in function to that described in the aforementioned Porter U.S. Pat. No. 3,557,317. However, as will become clear by reference to FIG. 4, the link circuitry of the present application has greater sophistication and can accomplish numerous additional functions. It will be recognized however, that the link circuitry such as that shown in the aforementioned Porter patent will operate in the present disclosure.

As can clearly be seen in FIG. 1, the PBX 10 also comprises a plurality of registers 60 through 60Z, where Z is any positive integer, which are adapted to be connected to the links 30 through 30M. As will be explained below, these registers may be conventional dial registers and depending upon the number of features designed in the PBX system, the number of registers utilized is optional. The terminations 12 are also connected to a control circuit 62 which for clarity will be referred to as a control highway and to a second control circuit 64 which for clarity will be referrerd to as a status highway. The control highway performs such functions as connecting the terminations, releasing the terminations, splitting the terminations, and other features which will be described below.

Connected to the registers 60 are a direct inward trunk access circuit (DITA) 66, a toll restricted circuit 68, an abbreviated dial circuit 70, a preset conference circuit 72, an assigned night answer circuit 74, and an unassigned night answer circuit 75. These circuits will be generally referred to in their entirety as the optional circuitry which performs the various automatic features which will be described below. It can be seen that each of these optional circuits are associated with the registers and for example only one DITA circuit 66 is required. This differs from the prior art, wherein it was necessary to employ as many DITA circuits as there were terminations or links. As can be seen from FIG. 1, both the links 30, the terminations 12, as well as the optional features, receive common timing signals from a scanner circuit 56 which is a conventional counter. This scanner circuit 56 carries out a time/division control concept which is utilized throughout the PBX 10.

The number of links 30 which are to be used throughout the PBX 10 are determined by the total number of termination circuits 12 as well as the total traffic to be handled by the PBX 10. A conventional link allotter circuit 78 determines which link 30 through 30M will be put in service for the next call. The link allotter circuit 78 marks the next idle link to be used and is functionally equivalent to a rotary switch. When a particular link circuit becomes busy, feedback from that link circuit causes the link allotter circuit 78 to advance to the next idle link circuit.

An attendant circuit 80 having an attendant console 82 allows an attendant to access calls via the link circuits. The attendant utilizes an automatic answer circuit similar to that disclosed in the aforementioned Porter U.S. Pat. No. 3,557,317, which responds to service requests and connects the attendant to calling parties through the talk path associated with each of the particular link circuits. An optional attendant override circuit 84 also is provided and is schematically shown as a separate vertical connected to the crosspoint matrix 40 which allows the attendant to connect to any termination 12 through 12N at will through controls contained on the attendant console 82.

To better understand the operation of the PBX 10, a procedure for a typical call will now be described in functional terms with reference to FIG. 1. Let us assume that the party on termination 12 wishes to call the party on termination 12A. When the associated telephone goes off hook, the resultant link closure is detected in circuitry associated with that line. When the scanner circuit 56 encounters the time slot associated with the termination circuit 12, a pulse will be generated on the horizontal control lead 42. This will cause the crosspoint at the intercept corresponding to the allotted link, in this instance let us assume link 30, to close. At this time, the link 30 receives class mark informaion identifying the originator by sampling the class mark contained on the status highway 64 at the time of seizure. This informaion is then retained in memory in the link circuit 30 along with the other originator status. The link circuit 30 then recognizes the condition wherein a termination circuit has connected to it and must therefore fetch a register circuit 60 through 60Z. If the termination 12 were an incoming trunk call rather than a line circuit, then the attendant would be signalled rather than the link fetching a register 60. Assuming that the incoming call is from a line circuit rather than from a trunk circuit, the appropriate register 60 is then requested and when available, responds to the link request which is recognized by the originator on termination 12 as the dial tone. The dial tone is then gated from the register 60 through the link circuit 30 and intercepted crosspoint to the originating line or termination 12. The station user on termination 12 then dails the desired number, in this case corresponding to termination 12a, which is accepted by the register 60. The register 60 then loads this number into the link circuit 30 and signals when the end of dialing has occurred.

The link circuit 30 then energizes the control circuit or control highway 62 for the associated dialed number during the time slot corresponding to that number, in this case, termination 12a. This results in a pulse appearing on the horizontal lead 44a of termination 12a causing the link to release the dial register and proceed with other operations such as timing for attendant recall or return busy tone if the termination 12a is busy. The link circuit associated with termination 12 now recognizes the condition where a crosspoint is connected to it but the associated station is on hook (no loop current). This causes ringing to be gated outward until the station user answers or until the originator elects to abandon the call and hang up. Since two crosspoints are fired on the link vertical in the crosspoint matrix 40, this condition is detected in the link circuit 30 and it is recognized as a completed call condition.

When the called party answers and trips ringing, an off hook signal is delivered on the appropriate status highway 64 back to the link circuit 30 which disables features such as the attendant recall timer which will be described below. When either party hangs up, the link recognizes that one of the two crosspoints involved in the call has released and releases the remaining crosspoint by opening the associated hold lead 48 on a momentary basis. As will be described in greater detail below, the link circuits 30 are arranged so that more than two crosspoints can be fired on a single vertical allowing for conference calls wherein a plurality of terminations are all connected on the same vertical.

Referring now to FIGS. 2 through 16, the details of the PBX 10 will be explained. As mentioned previously, the PBX 10 is adapted to be utilized with several terminations such as a ground/loop start trunk circuit, an interconnect trunk circuit 100, such as that shown in FIG. 2, and an E and M trunk circuit. For the sake of clarity, only the interconnect trunk circuit 100 will be described. In addition to the trunk circuit which may be utilized as a termination 12, it will also be recognized that line circuit 200 as shown in FIG. 3, as well as a conventional public address circuit, may also be utilized as terminations 12 on the PBX 10.

TRUNK CIRCUIT

Figure 2:
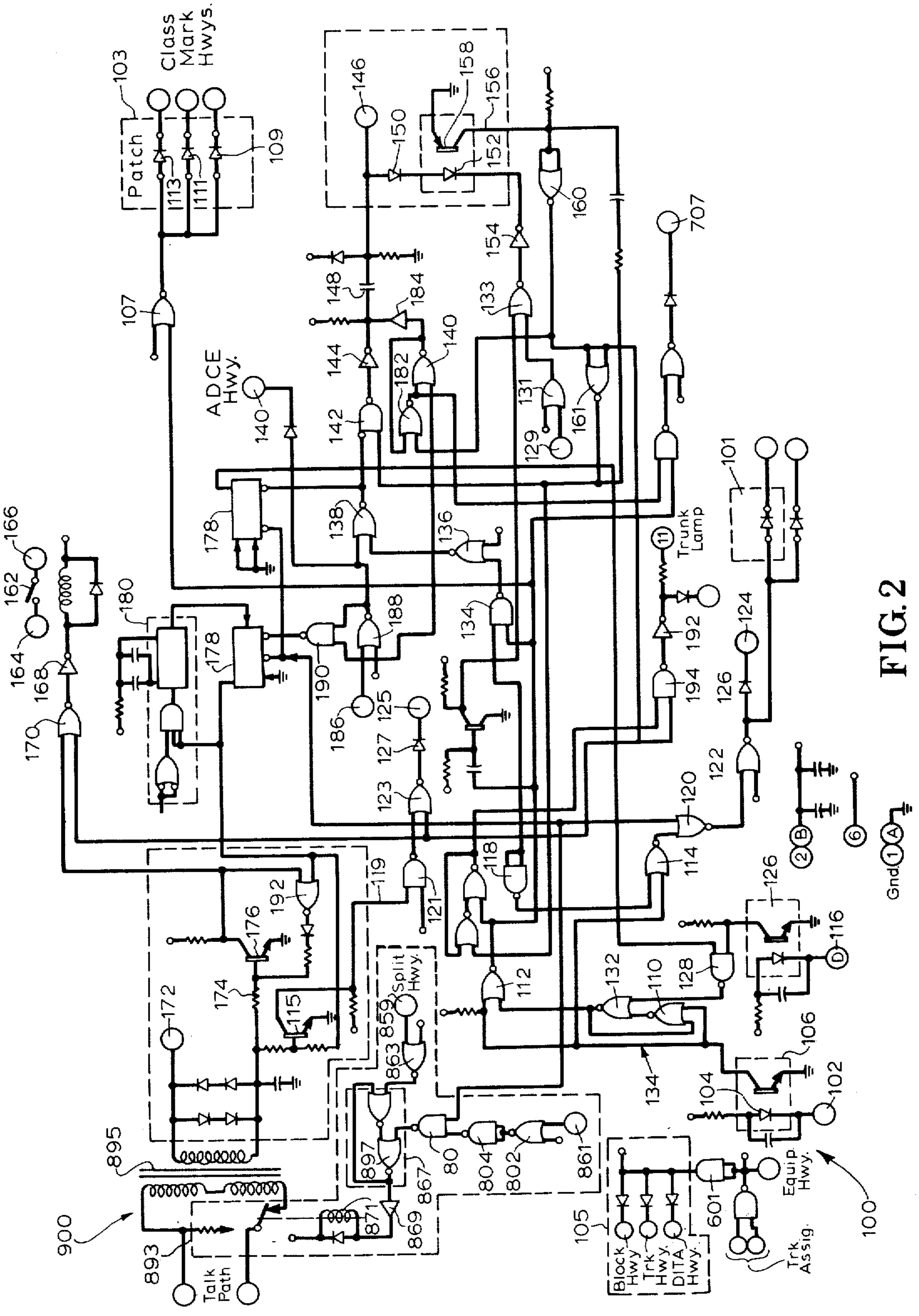
FIG. 2 is a schematic diagram of a typical trunk circuit which may be utilized in connection with FIG. 1.
Figure 3:
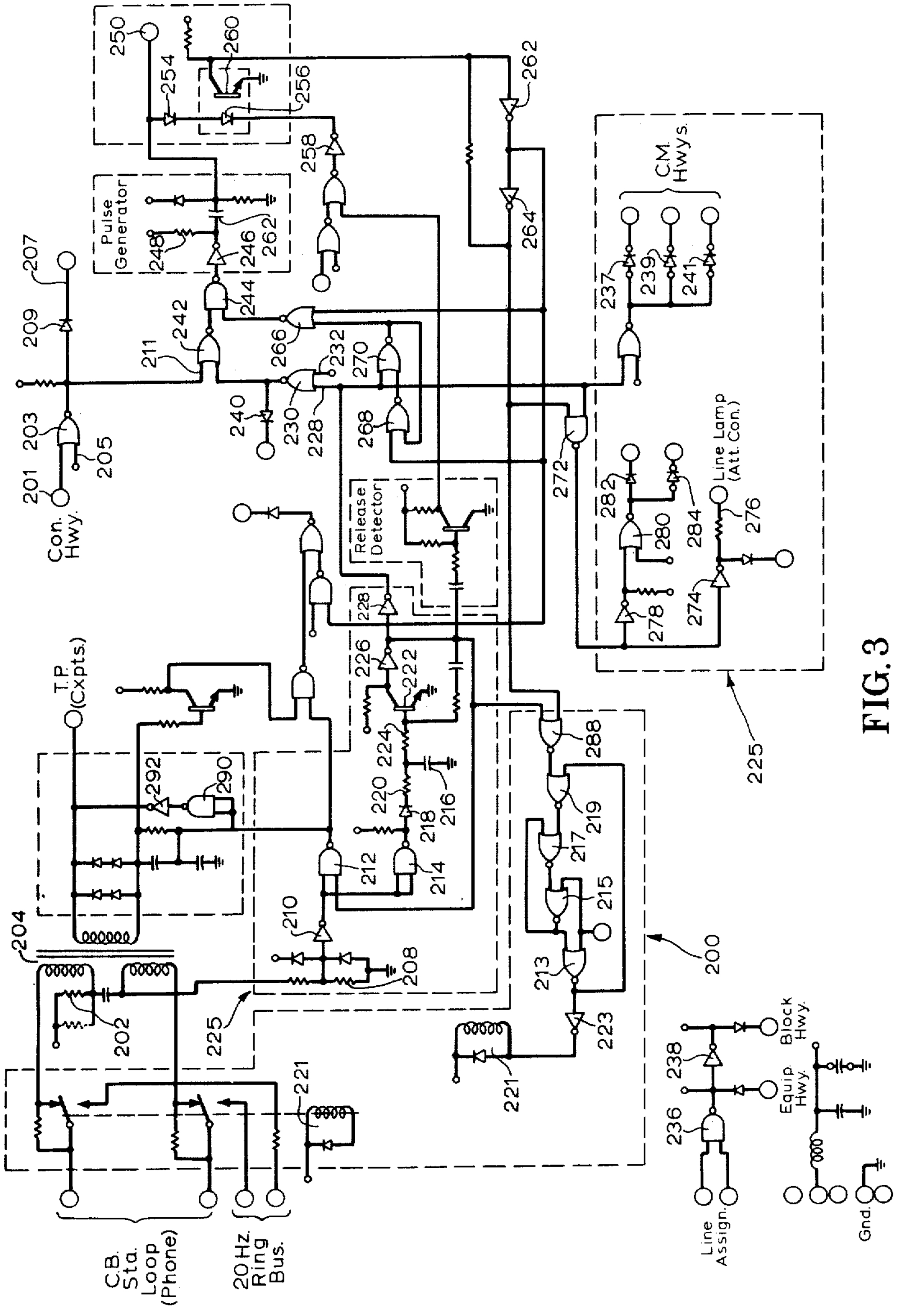
FIG. 3 is a schematic diagram of a typical line circuit which may be utilized in connection with the invention shown in FIG. 1.

Referring now to FIG. 2, one preferred embodiment of a trunk circuit will now be described in detail.

Initiation of an incoming call on the interconnect trunk circuit 100 occurs as a result of a conventional interconnect unit connected to the central office placing a ground on the lead 102. This causes forward current to flow through a light emitting diode 104 and a photocoupled pair switch interface 106 resulting in a transistor 108 being driven into saturation. The resultant low on the collector of the photo transistor 108 then appears at the input of NOR gates 110, 112 and 114. Since the trunk inhibit highway represented by lead 116 is normally high, the output of inverter 118 will normally be low so that both inputs to NOR 114 are low causing a high to occur at its output which occurs at the input of a NOR 120, causing its output to go low. When the time slot for this trunk circuit 100 occurs, two simultaneous lows will occur at the input to NOR 122 causing a high on the busy highway represented by the lead 124 through coupling diode 126 during the time slot for this trunk. This marks the trunk busy so that a head-on collision will not occur with a second party attempting an outward call at this time.

When ring occurs on the trunk circuit 100, the interconnect unit supplies a ground on the lead 116. This operates the photocoupled transistor diode pair 126 so as to drive the transistor therein in saturation, supplying a low to the input of NAND gate 128, causing its output to go high which then appears at the input of NOR 122, causing its output to go low. This then latches up the Flip-Flop 130 consisting of NOR gates 110 and 132 so that a sustained low results at its output. At this time, NOR 112 has two lows at its inputs so that its output goes high. This signal is the supervision signal for the trunk circuit 100 and it initiates the firing of a crosspoint in the crosspoint matrix in the following manner. At this time two highs will occur at the input of NAND 134. As explained previously, the trunk inhibit highway 116 is normally in a high state. This causes a low to occur at the output of NAND 134 so that a low appears at the input of NOR 136. When the time slot for this trunk occurs, a high will occur at the output of NOR 136 which then appears at the input of NOR 138 causing its output to go low. This sets Flip-Flop 140 so that the upper input to NAND 128 remains in a low condition even after the ring is no longer detected on lead 116 which ensures that a sustained high will appear at the input of NOR 132. This function is normally used for outward calls as will be explained below.

When the output of NOR 138 went low, it caused a high to occur at the output of NAND 142 which then appears at the input of inverter 144 causing a 24 volt excursion at the output of this inverter. The resultant negative polarity 24 volt pulse appearing on lead 146 then fires the crosspoint of crosspoint matrix 40 into the allotted link circuit 30. When capacitor 148 discharges, forward current will flow through controlled rectifier 150, the photocoupled diode 152, and back to ground through inverter 154. The resultant current is the hold current of the crosspoint being used for this call. When hold current flows, a low will appear on lead 156 of photocoupled transistor 158 causing a high to appear at the output of inverter 160. This is the termination busy signal. Inverter 161 generates a Termination Busy which is a logic signal and throughout the trunk circuit 100.

In order to trip the inward ringing, the SR contact 162 must be closed connecting the interconnect unit to trunk circuit 100 via the leads 164 and 166. These contacts are closed when a low appears at the output of inverter 168 as a result of a high at its input. A high occurs at its input when both of the inputs to NOR 170 are low. The lower input to 170 comes from the Termination Busy which would normally be low at this time. When the trunk circuit is connected to a link, a positive voltage will be fed back from the link on lead 172 which is the talk path connecting to the crosspoints. This voltage will then appear at the left end of resistor 174 driving transistor 176 into saturation so that a low appears at the upper input of NOR 170. The resultant closure of the SR contacts 162 trip ring from the interconnect unit and establish an audio connection through to the desired originator.

For inward calls, Flip-Flop 178 is maintained in a reset condition because a low has not occurred on the set lead. This disables Timer 180 so that outpulsing cannot occur on the inward trunk call. When Termination Busy signal went low, this low then appeared at the lower input to NAND 142 so that the output of capacitor 148 remained in a high condition even after the time slot had ended. This ensures that the HC lead (44 in FIG. 1) is only pulsed once. Also, when Termination Busy signal went high, a corresponding signal appeared at the lower input to NOR 182, maintaining its output in a low condition. Since SUP is now low, two lows will result at the input to NOR 140 causing its output to go high. By feedback action, NOR 140 drives B1 keeping its output low. The high at the output of NOR 140 then appears at the input of inverter 184 which is part of the lockout circuit which guards against multiple seizure in case the local party releases before the distant trunk party.

Initiation of an outgoing call on the interconnect trunk circuit occurs as a result of a low appearing on the Connect Highway which is lead 186 of the trunk printed circuit board. Simultaneous occurrence of a low on this highway and a low on the time slot lead for this particular trunk causes a high to appear at the output of NOR 188 so that a corresponding level appears on the ADCE highway 190. This momentarily disables the allotter 78 (FIG. 1) so that the trunk is connected to the link which is originating this call rather than the allotted link. The high at the output of NOR 188 also appears at the input to NOR 138 causing its output to go low. This then operates inverter 142, inverter 144, etc., in the same manner as was done for an incoming call. Once the crosspoint connecting this trunk to the desired link has been closed, Termination Busy for the trunk will go high.

When the trunk was originally connected to the supervision signal, it was still in a high condition because the Central Office end of the trunk circuit was not yet busy. This resulted in the simultaneous occurrence of two highs at the inputs to NAND 190 causing its output to momentarily go low which sets Flip-Flop 178. A high on the Q lead of Flip-Flop 178 enables Timer 180 which is a 10 second timer used in connection with dial outpulsing. The high at the output of Flip-Flop 178 also appears at the input to NOR 192 causing its output to remain in a low condition. This allows the dial pulse information on lead 172 to be transmitted through transistor 176 by inverter action. Pulsing then occurs as a result of alternate highs and lows commensurate with the dial pulse information appearing at the output of this NOR and the corresponding signal at the output of inverter 168 which then operates the SR contacts 162 in a corresponding manner. Once the dial pulses are interrupted for a 10 second interval, the sustained low appearing at the input to Timer 180 will allow this timer sufficient time to time out so that its Q output goes high which clocks Flip-Flop 178 into a low state. This disables the timer 180 since the Q output of Flip-Flop 178 goes low and also causes the output of NOR 192 to go high which ensures that the output of inverter 176 will remain in a low condition to prevent further outdialing. This capability is essential so that flash hook, call transfer, etc., can occur on the trunk connection even for outward trunk calls. However, the originator must wait 10 seconds after dialing before attempting to flash hook so that he does not release the Central Office connection.

A trunk lamp on the attendant console associated with this particular trunk circuit glows whenever the output of inverter 192 is low which occurs when the output of NAND 194 goes high. This occurs when either of the inputs to said NAND go to a low condition which appears when Termination Busy goes low (crosspoint closed to this turn) or when supervision goes low. For outgoing calls, Flip-Flop 178 is placed in a set condition as stated earlier. This causes its Q output to go low which then appears at the input to NAND 128 so that its output goes high. This signal then takes the place of the alert signal which would otherwise appear on lead 116 for inward calls. Since ring will not be detected in the interconnect unit for outward calls, it is, in effect, substituted for with the signal originating in the Flip-Flop 178.

As mentioned previously, the PBX 10 provides for class marking of each termination. All terminations are assigned a class mark. These class marks can be arranged in complex patterns restricting certain stations from making outside calls, or feature calls such as abbreviated dial. If a station user attempts to place a call restricted by class mark, the attendant automatically receives a service request signal. In addition, all stations are assigned a status so that they are in in arbitrary Group A, Group B, etc. Stations in Group A can call any other station. Stations in Group B can only call other stations which are also in Group B. If a Group B station attempts to call a Group A station, the attendant receives a service request. The attendant may override blocking and class marks by connecting to the appropriate station or feature for the originator.

Trunk circuits are class marked by patch circuits 101, 103 and 105. Inward calls are class marked 000 regardless of the class mark patching. Outward trunk calls are class marked in accordance with the patching on the trunk. Referring to FIG. 2, this circuitry operates in the following manner. When an inward trunk call occurs, the supervision signal must be high prior to firing a crosspoint into the matrix, so that a high appears at the lower input to NOR 107, causing its output to remain low even when the time slot occurs. However, for outward calls, the Central Office equipment has not yet had a chance to respond at the instant of connect so that the supervision lead will be low at this time. A simultaneous occurrence of two lows at the input to NOR 107 causes a high to appear at its output so that the class mark in accordance with the diode patching of controlled rectifiers 109, 111 and 113 is transmitted on the class mark highways 64 which the link samples and stores the class mark information.

The locate function of the trunk circuit 100 will now be described briefly. Locate is a function which is used to identify a trunk which is tied to a particular link for the purpose of splitting and reconnecting. The locate highway goes high under the following conditions:

1. The talk path on the crosspoint side for this trunk is in a low condition.
2. The time slot for this trunk is present.
3. A crosspoint has been fired to this trunk.

Transistor 115 is an inverter which samples the DC level on the talk paths connected to the link which is requesting the locate function. When a low appears on lead 172, transistor 115 is biased into cutoff so that its collector goes to a high. This signal then appears at lead 119 of NAND 121. When the time slot for this trunk occurs, the output of NAND 121 goes low which then appears at the input to NOR 123. If the termination is busy, Termination Busy signal is low at this time so that both inputs to NAND 123 are in a low state, causing its output to go high. The locate highway, lead 125 is then energized through coupling diode 127.

Release for the interconnect trunk 100 is initiated by a link used for a particular connection occurs as a result of the link opening the hold path of the crosspoint which is connected to this trunk. This causes the hold current to stop flowing so that the output of photocoupled diode 152 and transistor 158 goes to a high level. This causes the output of inverter 100 to go low so that termination busy assumes a corresponding level.

If the release was initiated by a second link such as might be the case for pre-empt or for an originator who wishes to abandon a call and transfer to another circuit, a momentary low will occur on the release highway lead 129, during the time slot for this trunk which causes the simultaneous occurrence of two lows at the input to NOR 131 causing its output to go high. This level then appears at the input to NOR 133, causing its output to go low. This then causes the outpt of inverter 154 which is an open collector high voltage device to go to an open state releasing the crosspoint which is tied to this trunk.

LINE CIRCUIT

Referring now to FIG. 3, a conventional line circuit 200 for use as a termination 12 for PBX 10 will now be described. When a station user lifts his telephone off hook, the resultant closure causes loop current to flow from +24V thru resistor 202, the upper winding of transformer 204, the station loop, the lower winding of transformer 204, resistors 206 and 208 to ground. The resultant voltage drop across resistor 208 supplies a high into inverter 210 causing its output to go low. This results in a high appearing at the outputs of NAND 212 and 214. NAND 214 charges capacitor 216 through controlled rectifier 218 and resistor 220. When the voltage on capacitor 216 is high enough, transistor 222 is driven into saturation through base drive current supplied through resistor 224. The resulting low on the collector of transistor 222 causes a high to appear at the output of inverter 226 which is the off hook signal for this line. Inverter 228 generates Off Hook (OH) which then supplies a low at lead 230 of NOR 232. When the time slot for this termination occurs, a low will appear on lead 232 of NOR 232.

The time slot signal is generated at NAND 236 and inverter 238 (both polarities). Number assignment is determined by the cabling on this PCB connector. The output of NOR 230 then goes high for one time slot, energizing the off hook highway through controlled rectifier 240 and causing the output of NOR 242 to go low. This low causes the output of NAND 244 to go high so that the output of inverter 246 goes low. Inverter 246 is an open collector high voltage device which had an initial level of +24V on its output owing to resistor 248. The resultant 24V excursion causes a −24V pulse to appear on lead 250 which is the horizontal control (HC) pulse for this line. A crosspoint now closes in the matrix 40 connecting this line to the allotted link.

As capacitor discharges, the polarity of the voltage on the HC lead 250 changes to plus owing to the crosspoint hold current supplied by the link. Hold current then flows through controlled rectifier 254, the light emitting diode 250 and inverter 258 to ground. Due to photocoupling, the collector of the photo transistor 260 is pulled to ground causing a low at the input to inverter 262. The resultant high on the output of inverter 262 is then the termination busy (TB) signal. TB signal is then generated by inverter 264. When TB goes high, this appears at the input to NOR 266 so that its output goes low. This signal keeps the output of NAND 244 high even after the time slot ends. TB also supplies a high to NOR 268 so that its output goes low. NOR 270 now has a low at both inputs, causing its output to go high, which supplies a high to the second input of NOR 268. NORs 268 and 270 form a lockout flip-flop which prevents re-seizure by a station which fails to hang up when its crosspoint is released. This is because OH signal must go high (phone on hook) to unlock NAND 244 and allow capacitor 252 to recharge. When TB or OH went low, a high resulted at the output of NAND 272. This high causes a low by inverter action of inverter 274 to appear on lead 276 and light the line lamp. The output of inverter 278 goes low also so that each time the time slot for this termination occurs, a high will appear at the output of NOR 280. This supplies busy and group highway signals through controlled rectifiers 282 and 284. Ringing was prevented when TB went low which appears at lead 286 of NOR 288 because the other input to this NOR is the OH signal which is high.

The originator is now connected to a link and register and can dial the desired number. If impulse dialing is used, momentary interruptions of the loop closure will occur commensurate with the digits dialed. Pulses corresponding to the dialed numbers then appear at the outputs of NANDs 212 and 214. The time constant of capacitor 216 and resistor 224 is such that the OH signal remains constant. However, the dial pulses pass through NAND 290 and inverter 202 out to the talk path connection into the link and dial register in use.

Initiation of an outgoing call occurs as a result of a low appearing on the Connect Highway lead 201, during the time slot of this line. Connect Highway 201 is connected to one of the inputs to NOR 203. The other input comes from TS lead 205. When both are low, as in connect, a high occurs on the output of NOR 203 as well as the ADCE highway 207 through controlled diode 209. ADCE (Allot Disable Connect Enable) inhibits the link allotter so that connect occurs to the link which originated the signal. Input lead 211 of NOR 242 also goes high so that its output goes low which appears at the input of NAND 244. This results in an HC pulse on lead 250 of the line circuit as in the case of an inward call. The circuit is now busy but not off hook. The result is that both inputs to NOR 288 are low causing a high at its output (OH is low, TB is low). NOR circuits 213, 215, 217 and 219 ensure that each burst of ring signal sent outward will be full one second duration so that arcing will not occur in the contacts of relay 221.

NOR 288 supplies a high to NOR 219, the output of which goes low so that a low now appears at the input to NOR 217. If the RS INT buss is now high (not trying to gate ring), the output of NOR 215 will be low so that both inputs to NOR 217 are low causing a high to appear at its output which also appears at the input to NOR 215. The next time RS INT goes low, both inputs to NOR 213 will be low causing a high at its output which then supplies a high to inverter 223, which operates relay 221 to send ring signal forward for one second. If RS INT had been low (trying to gate ring) at the time the output of NOR 219 went low, then the upper input to NOR 217 would have been high so that ring would not start until the next cycle of RS INT or approximately 3 seconds later. This ensures that the leading one second edge of gating is in step with RS INT. On the other hand, once the output of NOR 213 goes high if the originator then abandons the call making TB go high and the output of NAND 288 go low to terminate the ring, the second input to NOR 219 from NOR 213 will keep the output of NOR 219 low until the end of the RS INT signal. This ensures proper stopping of the ring cycle as dictated by RS INT.

When the called party answers, a loop closure is detected between ring bursts. The off hook closure detector 225 consists of gate 214 and the related circuitry and operates as described above for an incoming call. The resultant off hook signal places a high on lead 227 of NOR 288 which stops ringing. Also, during the time slot for this line, a high occurs on the off hook highway which supplies answer supervision to the link being used for this call.

As mentioned above in the trunk circuit description, all termination may be class marked. The line circuits are class marked by patch circuit 235. For inward calls, the class mark of the calling line is sent forward to the link being used for this call at the time the link is seized. For outward calls, the class mark of the line is reduced to the lowest possible level so that all other terminations, regardless of class mark, can call this line.

Class marks are established by three bits using binary weighing. The highest class mark is 111, the lowest is 000. For inward calls, the OH signal is low at the time the line connects to a link. The class mark as dictated by patching diodes 237, 239 and 241, is then stored in the link being used for this call. The link samples the class mark highways at the time of seizure. For outgoing calls, the OH signal is not yet low at the time of connect, which results in a 000 condition on the class mark highways. The link also samples the class mark highways at the time of connect which results in 000 being stored.

LINK CIRCUIT

The operation of the link 30 will best be understood by first describing four typical calls which may be completed by the link 30; station to station, station to trunk, trunk to station, and attendant originated. After this typical description, several components of the link 30 will be described in greater detail.

Figure 4A:
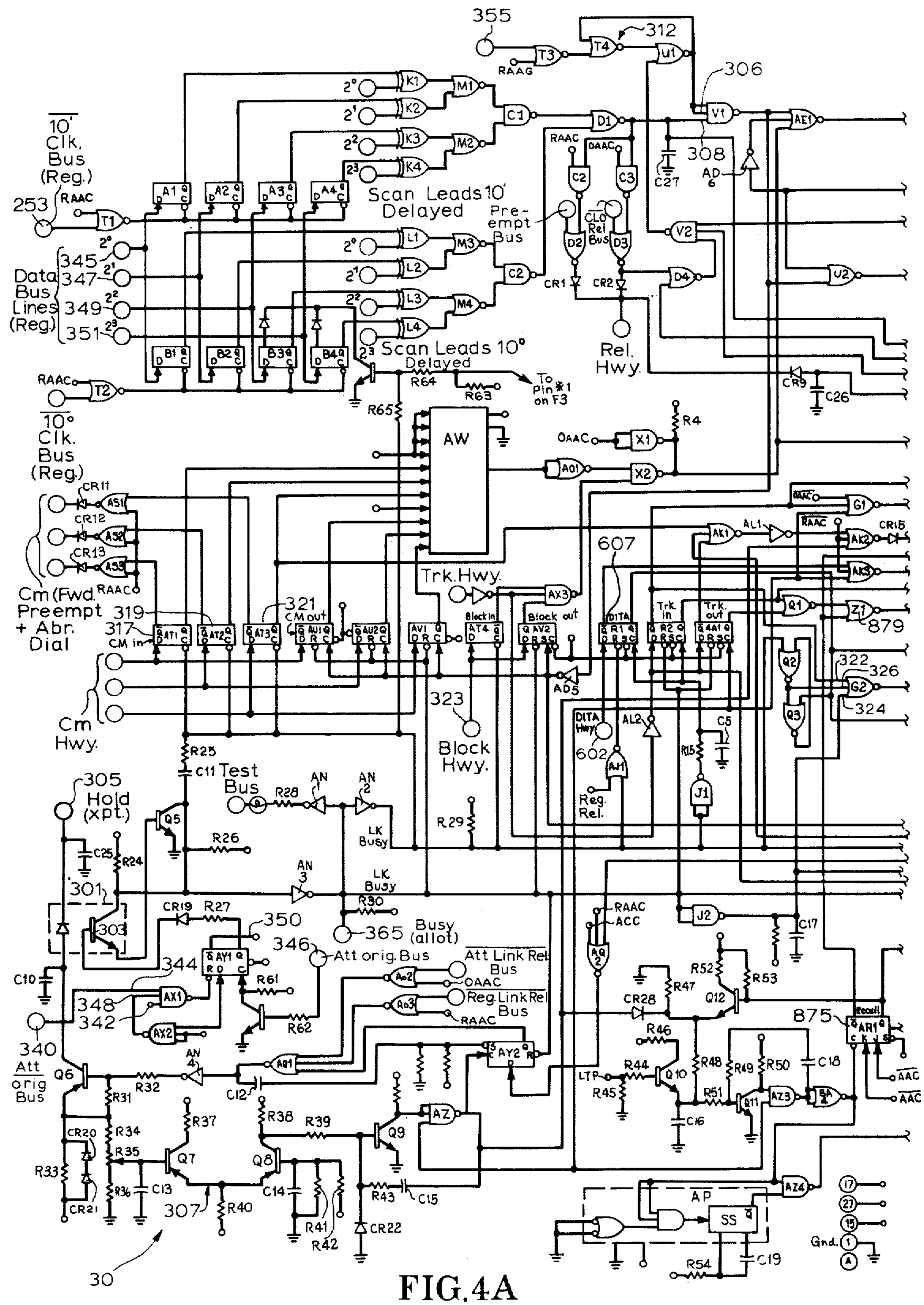
FIGS. 4A and 4B are schematic digrams of a typical link circuit which may be utilized in connection with the invention shown in FIG. 1.
Figure 4B:
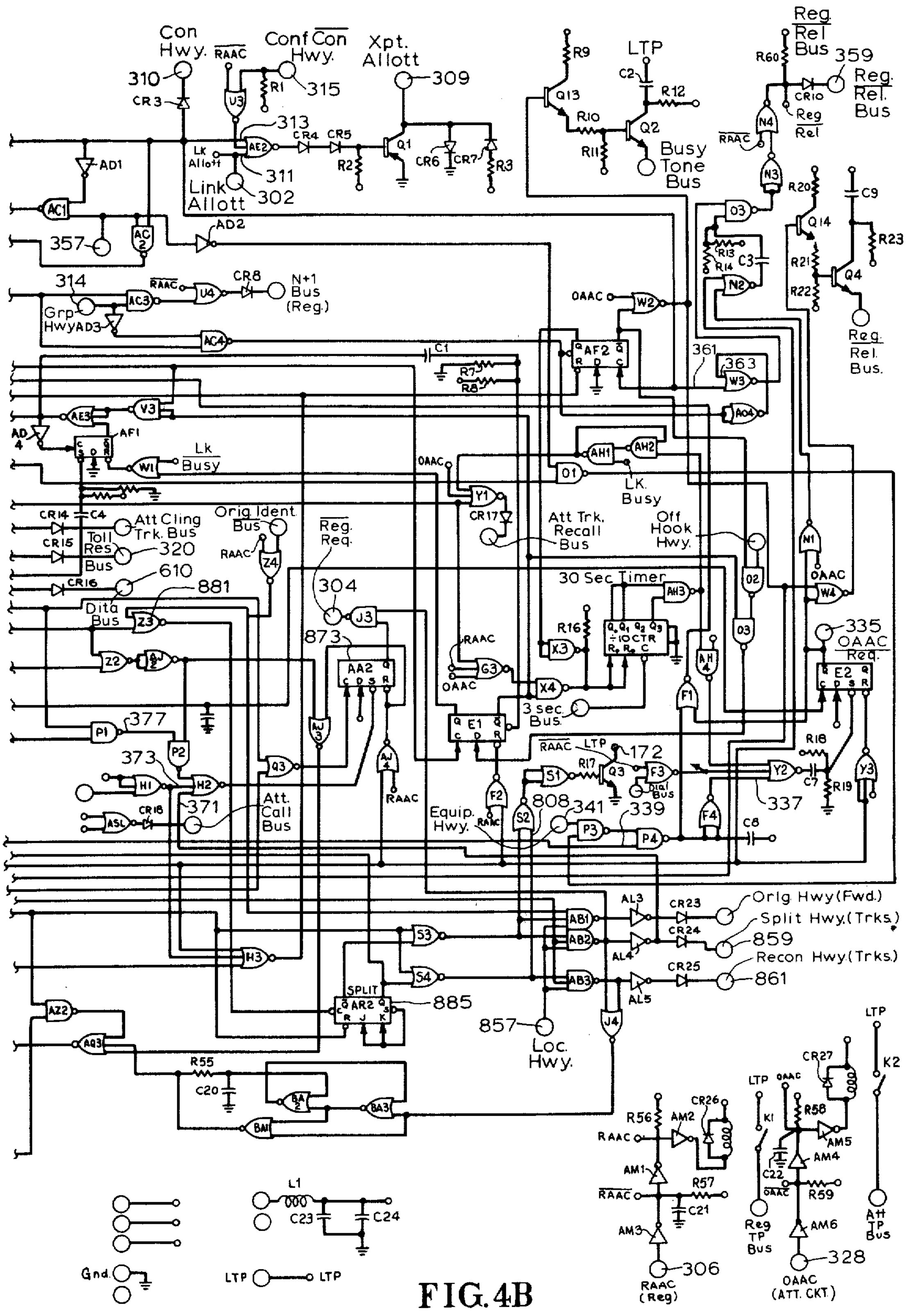

Referring now to FIG. 4, the function of link 30 will be described for a typical station to station call.

Initially when the link is idle, lead 302 will be high as dictated by the link allotter 78 (FIG. 1) to pre-mark this link to receive the next inward call. A high at this point causes the crosspoint allot head 309 to be low at this time marking the vertical lead in the crosspoint matrix 40 associated with this link to accept the next call. When the station user originates a call and places a horizontal control pulse into the matrix, negative polarity current flows through transistor Q1 and hold current is supplied from lead 305 of the link. After the hold switch in the intercepting crosspoint has closed, hold current will flow through the photocoupled pair, photo transistor 303 and diode 301, marking the link busy.

The link allotter 78 then removes its mark on lead 302 and steps to the next unused link. At the time the link became busy, Flip-Flops AT were clocked which presently has the class mark status of the originating station. In addition, the block-in Flip-Flop AT-4 is also storing the blocking status of the originator. Since the originating termination is not a trunk, the trunk-in flip-flop will be in a reset condition so that its Q output is low. Once the link becomes busy, both inputs to NOR-Q3 will be low, causing the output to go high which clocks a one into Flip-Flop AA-2 which then causes the register request lead 304 to go low. Once the register answers this call, a high will appear on lead 306 which then supplies Register Automatic Answer Signals (RAAC) for the link logic. In addition, K1 is now closed so that the originator hears dial tone back from the dial register. At this point, the originator dials the first digit which will then appear on the data buss lines from the register, leads 345, 347, 349 and 351. At the conclusion of dialing of the first digit, a momentary low will occur on lead 353 as dictated by the register so that a momentary high occurs from the output of NOR-T1 and the number then present on the data buss lines will be stored in Flip-Flops A. The originator then dials the second digit and a similar operation occurs on Flip-Flops B. At the conclusion of dialing the second digit, the register will then return a low on the EOD buss lead 355 causing a high to occur at the input to NOR -Tc, setting the EOD Flip-Flop 312. When the scanner encounters 56 a match between the number in Flip-Flops A and B and the number which it is presently on, a high will occur at the input to NAND-V1. Since the upper input to NAND-V1 is also high at this time, a low will result at the upper input to NOR-AE1. Since the termination being called is not busy, the busy highway will be low so that a low will also appear at lead 306 of NOR-AE1. Since class mark intercept is not indicated and blocking is not indicated, lead 308 of NOR-AE-1 will also be low. Simultaneous occurrence of three lows at the inputs of NOR-AE-1 causes a high to appear at its output. This high then energizes the connect highway lead 310 through coupling diode CR-3 and also causes the output of NOR-AE-2 to go to ground which then causes transistor Q1 to be biased into saturation. Once the desired termination becomes busy, a high will appear on the busy highway lead 357 so that simultaneous highs occur at the inputs to NAND-AC-2 causing its output to go low causing the output of NAND-V2 to go high which resets the EOD Flip-Flop 312. At the conclusion of the connect pulse, a high-to-low transition will occur at the input to NOR-W3 so that a low-to-high transition will occur at its output. The resultant high-to-low transition at the input to inverter N3 causes a low-to-high transition at the input to NOR-N4. The release signal which was originally high going to the registers is now brought to a low state and at this instant the register disconnects from this link, as evidenced by the RAAC level on lead 306 again assuming zero. This drops out Relay K1 disconnecting the register from the link talk path.

If the called station had been busy, a high would have been present at the busy highway lead 357 prior to the attempted connect which would have then been blocked. If this station were part of a group, a high would appear on the group highway lead 314 during this time slot. This would supply two simultaneous highs at the input of NAND-AC-3 causing its output to go low. This would result in a high appearing on the N+1 buss which connects back into the register through CR-8. The register would then increase the number which is presently stored in there by one. It would then reload the new number back into Flip-Flops A and B and initiate a new EOD signal. The connect will then be attempted on the N+1 termination. This sequential hunting will continue until the last available station in the group is attempted. If the call cannot be completed at that time, a low will appear on the S lead of Flip-Flop AF-2 which returns busy tone to the originator and disconnects the register from this link.

In a typical station to trunk call where a station originates a call, the link becomes busy and the originating station's class mark is stored in Flip-Flops AT as described above. The station user then receives dial tone and dials the preselected access code for an outgoing trunk call. This number is loaded into Flip-Flops A and B. The EOD flip-flop 312 is set. When the scanner encounters a match, a high appears at the output of NOR-D1 just as was accomplished for a station to station call. Connect, hunt, etc., occur in a similar manner. When the second crosspoint is closed to this link, a high occurs at transistor Q9 which is then connected to the clock lead of the trunk-out Flip-Flop AA-1. This clocks a one into the flip-flop because the truck highway is now high and the D lead of Flip-Flop AA-1 is therefore high by action of double inverters AL-1 and AL-2. The resultant one in Flip-Flop A sets up the logic associated with NOR-Q1 to allow the originator to do trunk hold, split, and reconnect. The Q output of the trunk-out Flip-Flop AA-1 is now low which places a corresponding signal at the input to NOR-AK1. A second input to NOR-AK-1 comes from the incoming class mark Flip-Flop AT-3 and this will be low if the most significant digit in the class mark is a zero. This means that the calling station is potentially toll restricted and will result in a high appearing at the output of NOR-AK-1. This causes a low to appear at the input to NOR-AK-2 and since the register is now connected to this link, a low will also be present at the center input which is RAAC. The lower input to this NOR comes from the output of inverter AZ which is low at this time because there are two crosspoints connected to this link. The result is that a high will appear at the output of NOR-AK-2 energizing the toll restrict buss lead 320 through diode CR-15. This signal is used in the register to mark the call as potentially toll restricted. It is not yet toll restricted until the three digit city access code is dialed into the system at which point the toll restrictor checks the number against the list and determines whether or not to allow the call. The station user may then outdial the desired number into the city trunk.

When an inward trunk to station call occurs, the class mark is arbitrarily selected as 000. The link becomes busy and the trunk-in Flip-Flop AA-1 is set so that a high appears at the upper input to NOR-Q3. This prevents Flip-Flop AA-2 from being clocked by the link busy signal coming from inverter J2. The delay presented by capacitor C17 allows the trunk-in Flip-Flop AA-1 sufficient time to be clocked prior to the attempted initiation of a clock pulse by J2. Since the trunk-in flip-flop AA-1 is set its Q output is low which will then appear at the upper input lead 322 to NOR-G2. Input leads 324 and 326 are also low because the link is busy and Flip-Flop Q2 and Q3 are in a reset condition. The resultant high at the output of NOR-G2 causes a corresponding level to appear at the clock lead of Flip-Flop E2 which initiates an Operator Automatic Answer Circuit (OAAC) request by clocking a one into Flip-Flop E2. During the period when the trunk originator is waiting for the attendant to answer this call, the inputs to NOR-W4 are in a low state so that its output goes high. This energizes emitter follower Q14 which supplies base drive current to transistor Q4 so that ringback signal is gated back to the originating trunk party. This informs him that he has connected himself to the PBX and is awaiting service from the attendant.

When the attendant answers, a high appears on lead 328 of the link which then operates Relay K2 to connect the attendant talk path to the link talk path. The attendant then determines the number of the desired station and completes the call by direct station selection which causes the register to load the desired termination number back into Flip-Flops A and B just as if the number were dialed. The call is then completed to the desired station just as was done in the case of a station-to-station call. If the called party is busy or does not answer for 30 seconds, a 30 second timer will cause the attendant to be recalled by again setting Flip-Flop E2. Since a trunk is involved in this call, the output of NOR-A1 will be low so that subsequent split and reconnect can be accomplished by this station party.

An attendant may originate a call by depressing the attendant originate switch on the attendant console. This connects the attendant to the link which is allotted as defined by a high appearing at the input to inverter AX-2. This high is also present on the D lead of Flip-Flop AY-1. When the aattendant originates a call, a low will appear on lead 350 so that lows are now present at leads 342 and 344 of NAND-AX-1. Reset has therefore been removed from Flip-Flop AY-1. Subsequently, the attendant buss 346 will go high causing a one to be clocked into Flip-Flop AY-1. When the attendant answer circuit responds to this call, a low will appear at lead 348 of AX-1 which ensures that the reset lead for Flip-Flop AY-1 will remain high. The Q output of Flip-Flop AY-1 is now in a high state and supplies base drive current to the photocoupled transistor 303 through resistor R27 and coupling diode CR-19. This causes transistor Q5 to be driven into saturation just as if a crosspoint were connected to this link through the hold circuit. The Q output of AY-1 is connected to point 350 which supplies a low to the left hand input of NAND-AH-4 causing its output to go high. This results in a low occurring at the output of NOR-Y2 which supplies a set pulse to Flip-Flop E2 which originates a request for the attendant circuit. In effect, the attendant is now answering her own call. By this method, the attendant circuit is forced to connect to the link which the allotter had previously marked. Once the attendant circuit responds, the OAAC lead 328 goes high closing Relay K2 which allows the attendant to complete calls just as a station user would do.

Referring now to FIG. 4, the link circuit 30 of the preferred embodiment will now be described in greater detail. It will be recognized by one skilled in the art that the link circuit 30 provides many functional capabilities, which if not desired, may be eliminated without departing from the spirit and scope of the invention. Each of the primary subsections of the link 30 will be described in some detail. The link is rather complicated and primary logic control of the PBX 10. The last portion of this section dealing with the link describes typical calls showing the operation of the circuits within the link as they relate to each other.

a. Cross Point Control

The lower left hand portion of FIG. 4 shows a portion of the circuitry associated with the crosspoint hold control. Hold current for the crosspoints is supplied through resistor R33 from +12 volt battery. Resistor R33 is a current sensing resistor to be described below. A PNP Transistor Q6 functions as a hold switch which allows the link control circuits to open the hold path. The photocoupled diode 301 and transistor 303 are used to detect the presence of hold current and generate a link busy signal as a result of hold current flowing. Hold current to the crosspoints flows outward through lead 305 through the crosspoints in the matrix 40 which are connected to the link 30 back to ground through the line or trunk circuits to which it is connected. When hold current flows, drive current is supplied to the transistor Q5 from the photo transistor 303 which operates as an emitter follower. This causes transistor Q5 to go into saturation so that its collector is now at a zero level. By inversion, the output of inverter AN-3 then assumes a high level which is the link busy signal. Inverter AN-1 now has a high at its input so that its output goes low which turns on the link test lamp provided the link test buss is energized.

Link Busy is generated by inverter AN-2. Base drive current for transistor Q6 comes from resistor R32 back through inverter AN-4 to ground. Part of the emitter current coming from +12 is bypassed to ground through resistor R32 to keep transistor Q6 in saturation. When hold current for one crosspoint flows the drop across resistor R33 is such that a change in voltage occurs at the top end of resistor R34. Resistors R34, R35 and R36 form a voltage divider which samples the voltage at the emitter of transistor Q6 in order to determine whether there is either one or two crosspoints connected to this link. If one crosspoint is connected, the call is incomplete. If several crosspoints are connected to the link, the hold current is diverted around resistor R33 and pass through controlled rectifiers CR-20 and CR-21 which bypass this resistor. This occurs when the voltage drop across resistor R33 is approximately 1½ volts. At that point the diodes conduct heavily so that there is no further increase in voltage drop as a result of several crosspoints being connected to this link. Resistor R35 is adjusted so that proper operation of the differential amplifier 307 comprising transistors Q7 and Q8 is achieved so that when one crosspoint is closed a low will occur at the collector of transistor Q9. When two or more crosspoints are closed, a high will occur at this collector.

Operation of the differential amplifier 307 is as follows. Emitter current for transistors Q7 and Q8 is supplied by common resistor R40. The base voltage of transistor Q8 is fixed by resistor divider R41 and R42. This is adjusted to approximately +6 volts. Therefore, if the voltage on the base of transistor Q7 becomes less positive than +6, transistor Q7 will tend to conduct and transistor Q8 will be switched to cutoff. At or near the point of switching, the net gain of the differential amplifier 307 is very high so that a very small voltage change at the base of transistor Q7 can cause a very large collector swing on transistor Q8. When one crosspoint is connected to the hold path, the voltage drop across resistor R33 is not sufficient enough to drop the voltage on the base of transistor Q7 and cause it to conduct. Transistor Q8 is then held in saturation so that its collector and emitter are at the same potential which is approximately +6. Since the collector of transistor Q8 is at approximately +6 volts, drive current for transistor Q9 will be supplied through resistor R39, holding transistor Q9 in saturation.

When a second crosspoint is connected to the link, the resilient doubling of the hold current causes an additional drop across resistor R33 which drops the plus voltage on the base of transistor Q7 so that it now conducts heavily. Transistor Q8 is then biased into cutoff so that a minus voltage appears on the base of transistor Q9. This biases transistor Q9 into cutoff so that its collector goes high. The high appearing on the collector of transistor Q9 is then connected into various other portions of the link which identify a completed call. Inverter AZ and feedback network comprising resistor R43 and capacitor C-15 improve the switching action of transistor Q9 so that sharp transitions occur as it is turned on and off. Capacitors C10, C13 and C14 filter out changes in the hold circuit current which occur as the crosspoints are initially fired. If a high occurs at the input to inverter AN-4, the output of this open collector device essentially assumes an open circuit condition. Under these conditions, there is no path for base current for Q6 and the result is that it goes into a cutoff condition, dropping out any crosspoints which are connected to this link.

A method of marking a link for either accepting an incoming call or connecting to a second party as when the call is extended is referred to as crosspoint allot. In the upper right hand portion of FIG. 4, the crosspoint allot lead is shown coming out of lead 309. This is controlled by PNP transistor Q1 which is normally in a cutoff condition. The link is marked when transistor Q1 is held in saturation which occurs when a low appears at the output of NOR-AE-2. When this output is low, base drive current for transistor Q1 is supplied through resistor R2. Controlled rectifiers CR-4 and CR-5 account for the base emitter drop of transistor Q1 and the fact that the output of NOR-AE-2 is not precisely at ground level. This ensures that all of the current supplied by resistor R2 is delivered to the base of transistor Q1 rather than to the output of inverter AE-2 when its output is in a low condition.

There exist three possible ways to cause the output of AE-2 to go low. One is for the link allotter to supply a high on lead 311 which link allotting occurs as a result of a pre-assigning of a link to accept the next inward call. Lead 313 which is the upper input of NOR-AE-2 is used in connection with an outgoing call where the allot lead must again be grounded during the course of connect. Notice that the connect highway is also tied to this point through coupling diode CR-3 to be explained later. A third method of link marking occurs as a result of the special control required for the preset conference. Conference connect highway comes in through lead 315. When the register answering circuit is connected to this link and a connect highway signal occurs on the conference connect highway, two lows appear at the input of NOR-U3 causing a high at its output which then allots this link during the predetermined time slot as dictated by the preset conference feature. When the output of NOR-AE-2 goes high, the resulting positive voltage is such that CR-4 and CR-5 are biased forward to force the base of transistor Q1 to become slightly positive. This biases Q1 into cutoff so that the link is unmarked. Controlled rectifiers CR-7 and CR-6 and resistors R3 protect the transistor Q1 from induced spikes which occur in the crosspoint coils as the crosspoints are energized and dropped out. Controlled rectifier CR-7 and resistor R3 ensure that the collector voltage on transistor Q1 does not exceed −24 volts. CR-6 ensures that reverse voltage will not appear on the collector of transistor Q1 which protects this system from multiple link seizures in the event that failures occur in the crosspoint matrix 40.

b. Class Mark

As mentioned previously, class marks associated with their terminations 12 are acted upon by the link circuit 30. The originating party class mark is stored in the three Flip-Flops 317, 319 and 321. Class mark signals present on the class mark highways at the time the link becomes busy are stored in these flip-flops for subsequent use. The D leads of each of the flip-flops are connected to the class mark highways which are under control of the originating line. Shortly after the link is connected to, link busy goes low so that the clock leads of all three flip-flops are placed in a low condition. The status of the D leads at the time this transition occurs is then retained in the flip-flops. These outputs are connected to NOR's AS-1 through 3 for use by some of the features in the system. In addition, the Q outputs of the flip-flops are connected to comparator AW for subsequent comparison with the class mark of the outgoing party. The outgoing circuit class mark is stored in flip-flops AU and AB which are just to the right of the incoming class mark Flip-Flops 317, 319 and 321. The D leads of flip-flops AU and AB are also connected to the class mark highways. Flip-Flops AU and AB are clocked at the instant connect is initiated by the link. This occurs at the beginning of the time slot of this circuit or termination to which this link is attempting to connect. If the inputs to comparator AW marked A have a higher binary weighing than the inputs marked B, then intercept is indicated. The output A greater than B is connected from comparator AW to inverter AO-1 so that if intercept is required the output of AO-1 will go into a low condition.

c. Blocking

The link circuit 30 also provides a blocking feature which restricts certain stations from calling other stations. It is not used in connection with features or class marks. Blocking patching occurs on the line circuits used in the system. Flip-Flop AT stores the blocking status of the originating or incoming party. The D lead of this flip-flop is connected to the blocking highway represented by lead 323. When the link becomes busy, the clock lead of the Flip-Flop AT undergoes a high-to-low transition and the condition on the D lead is retained in the flip-flop. Flip-Flop AV stores the blocking status of the outgoing party. The D lead of Flip-Flop AV is also connected to the blocking highway. When the link executes a connect function, a high occurs on the clock lead of the flip-flop which then retains the status of the outgoing line. If the blocking highway was low at the time the originator seized the link, the upper input to NAND-AX-3 will be high. This is because this input is connected to the Q output of the block-in flip-flop. If the outgoing termination energizes the blocking highway at the time connect occurs, the Q output of Flip-Flop AV will go high causing a corresponding level to appear at the lower input to NAND-AX-3. This situation indicates that the call should be blocked which results in a low appearing at the output of AX-3 which causes intercept, to be described later.

d. Trunks

The incoming trunk status is stored in Flip-Flop R, the D lead of which samples the trunk highway through inverter AL-2 and AL-1. Trunk highway is connected to Pin D and this signal appears on the D leads of both the trunk-in and trunk-out flip-flops by double inversion. The incoming flip-flop is clocked at the time the link first becomes busy through inverter J1 and the associated RC delay network. The outgoing flip-flop is clocked at the time of connect which is approximately the same time that transistor Q9 is biased into cutoff indicating that two crosspoints are now connected to the link.

If the incoming circuit is a trunk, and the link is busy, a high will occur at the output of NOR-G2. The upper input to this NOR comes from the Q output of the trunk-in flip-flop which would be low in the event of an incoming trunk call. A low will appear at the center input to G2, owing to the double inversion action of NOR's Q2 and Q3. If this output is low, a corresponding signal will appear at the input to NOR-3. Since the link is now busy, a low will also be present at the lead 325 input of NOR-Q2, thus a simultaneous low will occur at both inputs to Q3 causing its output to go high which latches the flip-flop in a set condition. The lower input to NOR-G2 will be low as a result of the link being busy. This signal is slightly delayed by the RC network shown and the inverting action of J2. When the output of NOR-G2 goes high, the attendant request flip-flop is clocked to a one condition.

e. Recall

Transistors Q10, Q11 and the related circuitry form a hook switch detector which is used in connection with hook switch recall of the special features; such as, split, reconnect, and registor request for adding parties to a call. The left end of resistor R44 is connected to the link talk path which is normally in a high condition as a result of drive voltages supplied by connected line or lines. By emitter follower action in transistor Q10, this voltage then appears on capacitor C16 and holds transistor Q11 in saturation. If the link talk path goes low as a result of station user flashing his hook switch for a sufficient period of time to allow capacitor C16 to discharge through resistor R51, transistor Q11 will be biased into cutoff supplying a high to the input of NAND AZ-3. If two or more crosspoints are connected to this link, a high will also appear at the lower input to NAND AZ-3, causing its output to go low. A feedback network comprising resistor R49 and capacitor C18 then convey this transition back to the base of transistor Q11 to sharpen the rise time of the transition. Inverter BA-4 then supplies a high to the clock lead of the recall flip-flop. This starts timer AP which times out in approximately 1 second. The timing interval starts when inputs 3 and 4 go high as described above. If the link talk path goes low before timer AP has a chance to time out, the recall flip-flop will be clocked into a one state as dictated by the Operator Automatic Answer Circuit (OAAC) and OAAC leads which are controlled by the attendant circuit. The OAAC is identical in function to the OAAC disclosed in the aforementioned Porter U.S. Pat. No. 3,557,317.

If timer AP times out before the link talk path again goes high, a low will persist at the output of NAND AZ-4, causing the output of NAND AZ-2 to go high so that the output of NOR AQ-3 goes low which maintains reset on the recall flip-flop. This negates the clocking transition since reset overwhelms the clock pulse. This condition will occur when the station user hangs up as in a three-way call where one of the parties wishes to release himself. The link talk path will remain low for a sufficiently long period of time to allow the timer AP to time out and not request a register or link split.

f. Register Request and Answer

Register request is initiated by setting Flip-Flop AA-2 which causes its Q output to go high. When two highs occur at the input to NAND-J3, its output goes low, causing a corresponding level to appear on lead 304 of the link. This is the register request signal. When a low persists at this point, the register answering circuits will seek out this link and connect to it as soon as the register becomes available.

Flip-Flop AA-2 is set when a low occurs at the output of NOR-H2 and this results when a high occurs at any of the inputs to NOR-H2. Lead 373 is high when the attendant is requesting a register and is connected to this link, so that OAAC is low and the attendant register request buss lead 375 is low which causes the output of NOR-H1 to go high delivering a corresponding level to NOR-H2. The remaining input to NOR-H2 comes from NAND-P2. The output of HAND P2 will go high when either of its inputs go low. Lead 377 of NAND P2 is driven by the output of NAND-P1. This point will go low when both of the inputs to NAND-P1 are high. This condition occurs when the incoming circuit is a trunk so that the trunk-in Flip-Flop Q lead is high and when the incoming circuit is a DITA trunk so that the DITA Q output is high. The remaining input to NAND P2 will go low when a high occurs at the input to inverter AJ-2. This will happen when both inputs to NOR-22 are low. If recall is signalled, the lower input to NOR 22 will be low.

If a trunk is not connected to this link, both the trunk-in and the trunk-out flip-flops will be in a reset condition so that the output of NOR-Q1 will be high. This causes a low to appear at the output of NOR-Z1 and sets up the condition for a register request. The circuitry is used when a progressive station conference is being set up where no trunks are involved in the call. Another way that Flip-Flop AA can be placed in the set condition is by placing a high on the clock lead, since the D lead of the flip-flop is strapped to +5. When the clock makes a positive excursion, a one will be set in the flip-flop. A one occurs one the clock lead when both inputs to NOR-Q3 are low. The lower input to NOR-Q3 comes from link busy which is delayed by capacitor C77. This input will be low shortly after the link becomes busy. The upper input to NOR-Q3 comes from the trunk-in flip-flop. If the incoming circuit is not a trunk, the Q output of this flip-flop will be in a low state at the time the link becomes busy which will cause Flip-Flop AA02 to be clocked into a one condition. This results when a station originator seizes a link in a normal call.

After the register request signal has been initiated, the register answering circuits locate the link which is requesting service and place a high on lead 306. This high causes a low to appear at the output of inverter AM-3 so that RAAC is now low and the output 381 of inverter AM-1 goes high which is the RAAC lead of this link. Also, the output of inverter AM-2 goes low which energizes Relay K1 connecting the link talk path to the register talk path. Since the link talk path is connected to the station and trunk users, via the crosspoint matrix, these terminations are now directly connected to the register through the contacts of Relay K1. When the register responds to the service request condition, a high will appear at the right hand input of NOR-AJ-4 causing its output to go low which then resets Flip-Flop AA02 terminating the register request. In addition, the RAAC and RAAC leads connect to many points throughout the logic circuits of the link to allow the register to control and respond to signals to and from the link during the time it is connected.

g. Attendant Request and Answer

Attendant request for service is initiated by the link 30 through setting of Flip-Flop E2 which is on the right hand center portion FIG. 4. This causes a low to appear on lead 335 of the link which is the OAAC request lead. OAAC is defined as the Operator Automatic Answer Circuit. When a low appears on this lead, the attendant circuit is requested to connect to this link. When the attendant responds, a high will appear on the OAAC lead 335. Flip-Flop E is set when a low occurs at the output of NOR-Y2. This occurs when a high appears at any of the inputs to Y2. Lead 337 receives a high when the input to inverter F4 is low. This occurs when the number dialed does not exist or a class mark block occurs. This would be a case where a station user has dialed a feature or trunk and cannot access this circuit because of his class mark. The input to F4 goes low when the output of P4 goes low and this occurs when both of the inputs to NAND-P4 are high. Input lead 339 of NAND-P4 goes high during the time slot of the number which the originator has dialed. The upper input to NAND-P4 will be high if either of the inputs to NAND-P3 are low during this time slot. The upper input to NAND-P3 is connected to lead 341 which is the equipage highway. The equipage highway will be high during the time slot of all terminations which are actually equipped in the PBX 10.

If either of the inputs to NAND-P3 are low during the time slot of the dialed number, the attendant will be called by setting Flip-Flop E. The lower input to NAND-P3 comes from the output of NAND-01. Intercept will occur if both inputs to NAND-01 are high during the time slot of the called number. The upper input to NAND-01 is high if the busy highway is low during the time slot of the dialed number. The lower input to NAND-01 would be high if either of the inputs to X2 are low at this time. A low occurs at the upper input to NAND-X2 if a high is present at the output of comparator AW which means the class mark of the outgoing circuit is higher than the class mark of the incoming circuit and therefore the call should be intercepted. This produces a high at the input to inverter AO-1 causing its output to go low. The lower input to NAND-X2 comes from the blocking flip-flops through NAND-AX03. This output will also be low if blocking is indicated as described previously. If the attendant is connected to this call, intercept marking will be blocked by inverter X1. When the attendant is connected to the link, a high will appear at the inverter of X1 causing its output to go low, so that even if X2 tries to cause a high to appear on this lead, the current from resistor R4 will be diverted into NAND gate X1. The center input to NOR-Y2 will be high if both inputs to NOR-F3 are low. This occurs when the register is connected to this link (RAAC is low) and the originator has dialed zero so that Pin X of the link printed circuit board is low. The upper input of NOR-Y2 will be high if either input to NAND-AH-4 is low. The left input will be low when the 30 second timer times out. The right input to NAND-AH-4 will be low when the attendant originates a call setting Flip-Flop AY-1 (lower left of drawing). Another method of setting Flip-Flop E is through the clock lead which goes high when the incoming circuit is a trunk it is not DITA and the link is busy. This signal comes from NOR-G2 and was previously described.

Attendant answer occurs when the attendant depresses the answer switch so that the OAAC circuits connect to this particular link. This results in a high appearing on lead 311 of the link causing the output of inverter AM-6 to go low which is the OAAC signal. AM-4 then inverts this signal so that OAAC is generated. Inverter AM-5 operates Relay K2 to connect the attendant talk path to the link talk path. OAAC and OAAC then connect to various points in the logic of link as shown on the drawing. OAAC connects to the input of NOR-Ye so that when the attendant responds to this call the output of Y3 goes to zero resetting Flip-Flop E. This cancels the OAAC request, since the attendant has now answered the call.

h. Attendant Trunk Recall

Through the use of conventional 30 second timer comprising a decimal counter AG, the attendant is able to automatically be reconnected to a trunk every 30 seconds and a suitable indicator informs the attendant that a recall has occurred which resulted from a 30 second time-out rather than a new inward trunk call.

i. Number Store

When the register is connected to the link 30, the RAAC lead is low. This low then appears at one of each of the inputs on NOR's T1 and T2 at the upper left hand side of FIG. 4. Binary coded decimal information representing the dialed number appears on the data buss lines coming from the register 60. These are leads 345, 347, 349 and 351. These leads connect to the D leads of the plurality of Flip-Flops A and B which perform the number store function. After the first digit has been dialed, the BCD number is now presented on the D leads of the Flip-Flops A and B. The register then produces a $10^1$ clock pulse which places a momentary low on lead 353 of the link 30 so that both inputs to NOR-T1 are low. This causes a momentary high to occur at the output of NOR-T1. When the clock pulse from the register 60 terminates, the clock leads of Flip-Flops A are all brought to a low condition, so that the information which was present on the D leads at the time of this transition is retained in the four Flip-Flop A. A similar action occurs for the digit $10^0$ which is then clocked into the Flip-Flops B. The outputs of these flip-flops are then compared with the delayed scan leads from the scanner 56.

Exclusive OR gates K and L then compare the status of Flip-Flops A and B with the current status of the scan leads. When a match occurs, that is when they are either both high or both low, coincidence occurs such that the outputs of these exclusive OR gates K and L go low. When the outputs of all of the exclusive OR's are simultaneously low, highs will result at the outputs of gates M1 through M4 so that the outputs of NAND's C1 and C2 will both be low. This then causes a high to occur at the output of NOR-D1. The time slot signal present at this point represents the number currently being stored in the link flip-flops. This then appears at the input to NAND-V1 which will be used for subsequent connect to the desired party.

j. Connect

When the second digit has been dialed into the register, the EOD signal on lead 355 goes low. This causes two lows to appear at the input to NOR-T3 so that its output goes high. This causes the output of NOR-T4 to go low so that two lows exist at the input to NOR-U1. The resulting high at the output of NOR-U1 is then fed back to the input of NOR-T4 so that this flip-flop is in a set condition.

When the time slot of the dialed number occurs in the scanner 56, both inputs to NAND-V1 will be high causing its output to go low. This low then appears at the upper input to NOR-AE-1. This time slot is also sent to inverter AD-5 for clocking the block-out and class mark out flip-flops described above. If intercept is not indicated, the output of NAND-X2 will be low at this time so that the lower input to NOR-AE-1 will also be low. If the termination being called is not busy, the busy highway which is lead 357 will be low during this time slot so that the output of NAND-AC-1 will be high. This causes the output of inverter AD-6 to be low also. Since all three inputs to NOR-AE-1 are now low, the output will go high causing a high to appear on the connect highway through coupling diode CR-3. This also energizes NOR-AE-2 through the upper input causing its output to go low so that Q1 is placed in saturation by drive current supplied by resistor R2. This remarks the vertical associated with this link so that the connection can be established to this particular link. When connect occurs, a high is also connected to the input of inverter AD01 so that its output goes low. This causes the output of NAND-AC01 to remain high even after the busy highway lead 357, goes high. When the connect pulse from NOR-AE-1 is present and the busy highway becomes high, two highs appear at the input to NAND-ACO2 causing its output to go low. This low then appears at the upper input to NAND-V2 causing its output to go high. This resets the EOD Flip-Flop T4 and U1 which terminates the attempted connect since it has now been completed.

If the termination in question was busy prior to the connect, a high would have appeared on the busy highway lead 357 prior to the time slot which occurred from D1. This would means that both inputs to AC01 were high prior to the attempted connect so that the output of AC01 would then be low. This would then cause a high to appear at the output of inverter AD-6 so that gate E1 would have been blocked. The low at the output of AC-1 would have then been present at the input to NOR-U2 so that when the desired time slot occurred the second input to NOR-U2 would also be low so that a high will appear at its output. If the circuit in question is part of a group, a high would at this time be present on Pin 14 of the link so that both inputs to NAND-AC03 will be high causing its output to go low. Since the register 60 is presently connected to this link, a high would then appear at the output of NOR-U4 which will energize the N+1 buss through diode CR-8. This will cause the register to hunt to the next highest termination number. If the number dialed was not part of a group, the group highway would have been low at this time so that a high would appear at the output of inverter AD-3 so that two simultaneous highs would occur at the input to NAND-AC-4 causing its output to go low. This would then set Flip-Flop AF-2 causing busy tone to be gated back to the originator.

When Flip-Flop AF-2 is set the Q output is low. If the attendant is not connected to this link, the second input to NOR-W2 will also be low causing its output to go high. A high will then appear at the left end of resistor R10 by emitter follower action of Q13. This drives transistor Q2 into saturation connecting the link talk path to the busy tone buss through capacitor C2. Busy tone will then be gated to the originator. If camp-on is utilized, when connect does subsequently occur, a high will appear on the clock lead of Flip-Flop AF02 which clocks a low into this flip-flop since the D lead is connected to ground. This terminates the return of busy tone once the connection is established after a camp-on. The Q output of Flip-Flop AF-2 supplies a high to inverter X3 so that while busy tone is being gated the 30 second timer is allowed to operate. This results in attendant recall 30 seconds after the camp-on is initiated.

k. Off Hook

The off hook status of the called party is stored in Flip-Flop E1. The clock lead of this flip-flop is connected to the time slot of the number stored in the link, thus each time the scanner 56 encounters this number the clock lead will go high. The D lead of the flip-flop is connected to the off hook highway by the double inverting action of NAND-02 and 03. Once the called station goes off hook, a low will appear on the Q output of the off hook flip-flop. This then appears at the left hand input to NAND-03 causing its output to remain high. Thus once a one is clocked into the off hook flip-flop, it cannot then again be clocked back into a zero state. The only way to achieve a zero state is to apply reset to the off hook flip-flop. Prior to the off hook flip-flop being clocked in the set condition, the Q output is in a high condition and the second input to NAND-03 is also normally high until the called party goes off hook and busy tone is not being gated to the originator. This results in the simultaneous appearance of two highs at the inputs to NAND-02.

l. Recall and Abandon

If a station user is setting up a three-way call or a progressive conference call and the last party he has dialed fails to answer, he can then recall a register and negate the call to the first party. This happens in the following manner. If the called party did not answer the initial ringing, this party would then be in the on-hook condition so that a low appears at the lower input to NOR-W1. The upper input to NOR-W2 would also be low since the link is now busy. This removes reset from Flip-Flop AF-1. When recall occurs, the Q output of Flip-Flop AR-1 goes low which applies a set signal through differentiator C4 to Flip-Flop AF-1. This causes its Q output to go low. Since the called party is not off hook, the Q output from Flip-Flop E1 will be in a high condition. This high then appears at the input to NAND-V3. During the time slot of the called party, a second high will occur at the upper input to NAND-V3 causing its output to go low. This then will cause a high to appear at the output of NOR-AE-3 which energizes the release highway, Pin M of the link through coupling diode CR-9. At the end of the time slot as determined by inverter D1, the output of AE-3 will go low. This then causes the clock lead of AF-1 to go high so that a zero is clocked into this flip-flop. The original termination number which was stored in the link has now been released via the release highway.

If the original called party was busy and the originator was hearing busy tone, when recalled was signalled, the Q output of the recall Flip-Flop AR-1 would go into a high state causing a low to appear at the output of NOR-H3. This supplies a reset signal to the busy tone Flip-Flop AF-2 which terminates the transmission of busy tone. The low would also appear at the center input of NAND-V2 causing its output to go high which would reset the EOD Flip-Flop T4 and U1 so that the link no longer attempts to connect to the original party.

m. Register Release

Register release occurs on lead 359 of the link 30 which is at the upper right hand side of FIG. 4. The release signal occurs on the cessation of a high appearing on this buss; that is to say, release by the register occurs on the transition from plus to ground. Register release cannot occur unless the register 60 is actually connected to this link as evidenced by a low appearing on the RAAC input to NOR-N4. The function of the register will be described below.

In order for register release to occur, a low must also be present at the upper input to NOR-N4. Therefore, a high must be present at the input to inverter N3. This will occur when a low exists on either input to NAND-03. A low will be present on the upper input to NAND-03 if either of the inputs to NOR-W3 are high. Lead 361 of NOR-W3 goes high when connect occurs as when a normal call is placed and completed. Lead 363 of NOR-W3 goes high when the input to inverter AO-4 goes low. This occurs when the busy tone flip-flop is set which means that the call cannot be completed at this time and the register is no longer required. The second input to NAND-03 comes from differentiator C3 which is driven by NOR-N2. Therefore, when a high appears on either of the inputs of NOR-N2, a pulse will appear at the appropriate input of NAND-03. A high occurs on the upper input to NOR-N2 when the link is no longer busy, since this point is tied to link busy. The remaining input to NOR-N2 comes from NOR-N1. The output of this NOR will go high when both of its inputs are low which means that the attendant is not connected and that the attendant has been requested. This means that the register is no longer required for this call since the attendant will be connected to the caller shortly.

n. Link Release

If either party in a two-party call hangs up, the resultant reduction in crosspoint hold current is detected in the differential amplifier Q7 and Q8 so that a high-to-low transition occurs at the collector of transistor Q9. This causes a high to appear on the clock lead of release Flip-Flop AY-2. If busy tone is not being gated and neither the attendant circuit 80 nor the register 60 is connected to this link, the output of NOR-AQ-2 will be high. This high will then appear at the D lead of Flip-Flop AY-2, so that when the clock lead subsequently goes high a one will be clocked into the flip-flop. This high then appears at the input to NOR-AQ-1, causing its output to go low. The low which is then present at the input to inverter AN-4 causes this output to go high which opens transistor Q6 so that hold current can no longer flow to the remaining party involved in this call. This type of operation is sometimes referred to as either party release. Lead 365 of the link which is the link busy signal also has a low at this time so that the allotter can utilize this link for inward calls. Once link release has been effected, the reset lead of Flip-Flop AY-2 is brough to a low condition which resets this flip-flop so that the link can be used again.

Link release can also be initiated by the attendanted or the register. Register link release occurs in the event a toll restricted number is dialed by a toll restricted line. Attendant link release occurs as a result of a manual attendant controlled signal originating from the attendant console. If the attendant is connected, simultaneous lows will appear at the inputs to NOR-AO-2. In the case of register link release, simultaneous low inputs will occur at the NOR-AO-3. When either of these outputs go high, a low results at the output of NOR-AQ-1 causing the hold path to be opened. Register link release also occurs when the 10 second timer in the register times out as a result of an originator not dialing a consecutive digit in 10 seconds.

In addition to the several features described above, the link 30 performs two other important functions; Direct Inward Trunk Access (DITA), and Split and Reconnect of a Trunk of Line. The DITA function will be described below in relation to the block diagram n FIG. 7 as well as the detailed schematic of FIG. 4. The Split and Reconnect function of the link 30 is integrally related to both FIGS. 2 and 4 and will be described below in reference to these figures as well as FIGS. 14 and 15.

REGISTER CIRCUIT

The register circuits 60 through 60Z in the preferred embodiment are dial registers and are connected to the terminations 12 through the links 30. Optional features such as DITA circuit 66, Toll restrictor circuit 68, abreviated dial circuit 70, preset conference circuit 72, etc. are connected to the PBX 10 through the register circuits 60 through 60Z.

Each register 60 in the preferred embodiment comprises several subsections. Each of the subsections will be described below with reference to FIG. 5.

a. Register Automatic Answer Circuit

Figure 5A:
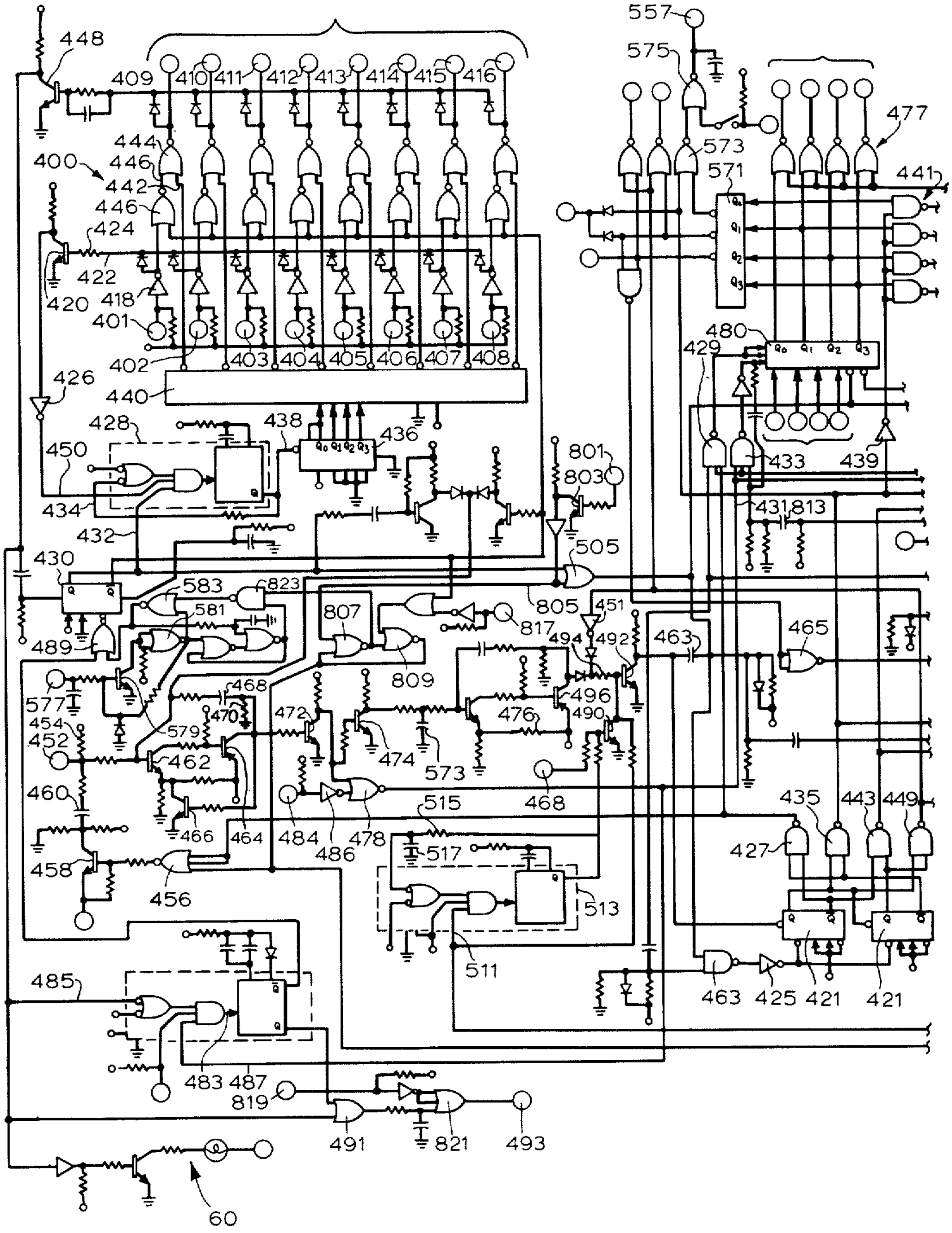
FIGS. 5A and 5B are schematic diagrams of the register utilized in the preferred embodiment of the invention.
Figure 5B:
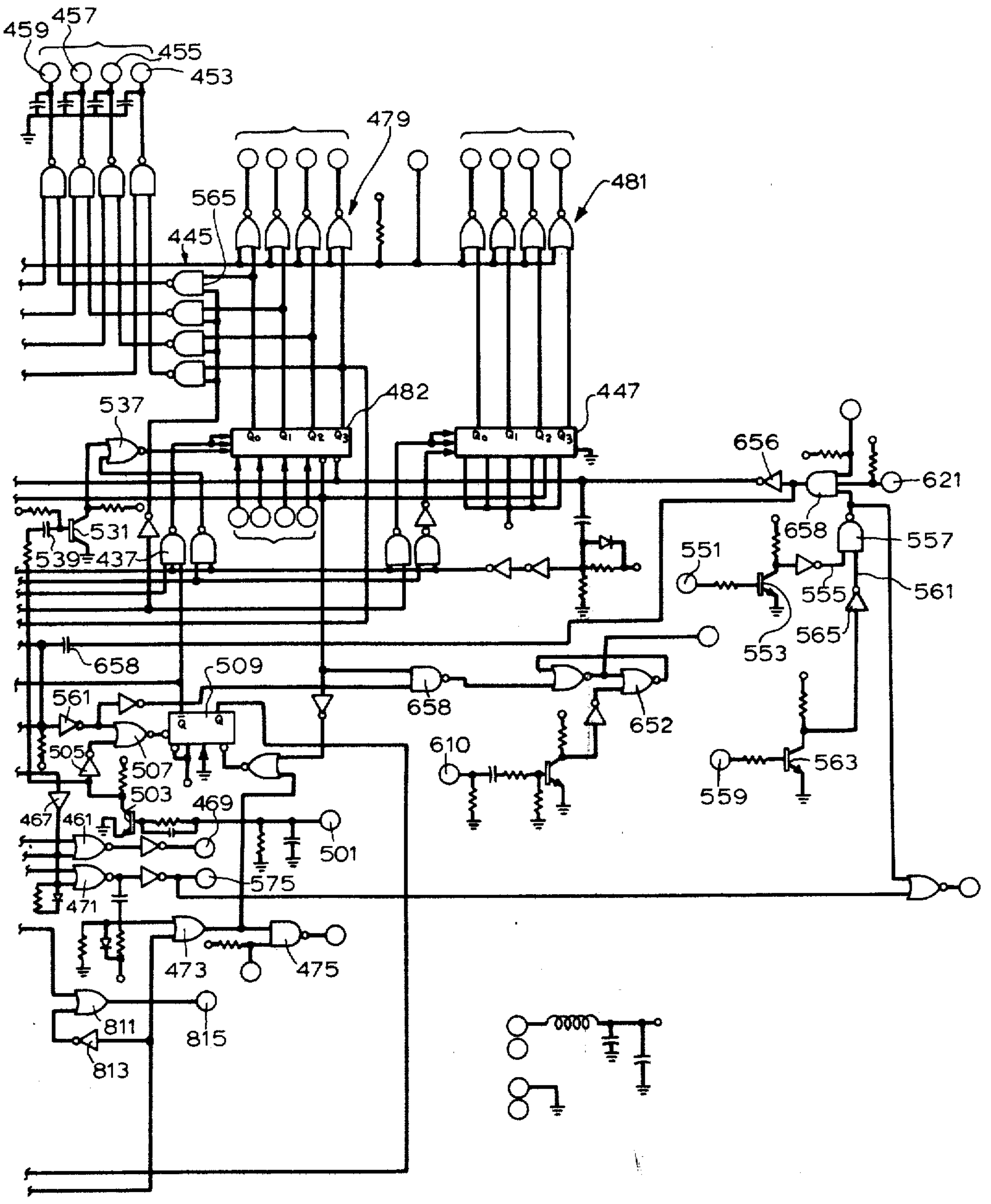

The Register Automatic Answer Circuit (RAAC) 400 is located in the upper left hand portion of FIG. 5 and may be considered as an eight position rotary switch where the RAAC inputs near the bottom of the gate assembly. Leads 401 through 408 are register request signals originating from links 30 through 30N. The upper connections, 409 through 416, are answer signals which are sent outward to the links 30 which connect the register 60 to one of the plurality of links shown.

Operation of RAAC 400 is as follows. Assume a low occurs on lead 401 corresponding to the lowest numbered link in this group. This will cause a high to occur at the output of inverter 418 which drives transistor 420 into saturation through base drive current supplied by coupling diode 422 and resistor 424. The low which appears on the collector of transistor 420 will then cause a high to appear at the output of inverter 426 so that a corresponding level apears at the input to one shot multivibrator 428. Assume that Flip-Flop 430 is in a set condition so lead 432 of the multivibrator 428 is also at a high level. The multivibrator will then run as a clock by virtue of the feedback from the Q output to Pin lead 434 and the RC delay intervening, which delivers clock pulses to counter 436 at lead 438. This counter 436 then supplies BCD inputs to the one out of 10 decodeer, 440, so that the outputs become low on a one-at-a-time basis, depending upon the current number in the counter 436. When output zero from the decoder goes to a low state, this low will appear at lead 442 of NOR-444. Lead 446 of NOR-444 will also be low as a result of the high which is now present at the output of inverter 418 which then energizes NOR-446 so that its output goes low. Simultaneous occurrence of two lows at the input to NOR-444 causes its output to go high which connects the register 60 to link 30.

A high at the output of NOR-444 drives transistor 448 into saturation through a coupling diode and a resistor. This low then supplies a pulsed reset to Flip-flop 430 so that its Q output goes low which turns off clock 428 so that the counter remains at a count of zero. Once the register is no longer needed, Flip-flop 430 will be clocked into a one state again which will step it off of the first link onto the next link requesting service if one is present at this time. If another link is not at this time requesting service, lead 450 of multivibrator 428 will be in a low state so the counter cannot run. Once Flip-Flop 430 is reset as a result of transistor 448 turning on, its Q output goes high supplying a corresponding level to NOR-446. This level then takes the place of the register request signal which was initiated on lead 401 since when the register answer circuit connects to the link the request signal which orginally appeared on lead will be negated. This signal on lead 442 of NOR-444 in effect simulates the register request which is no longer present.

b. Dial Pulse Detector

Once the register 60 has been connected to a link 30, the originating station user may now impulse dial directly into the register through the crosspoint and link relay circuits. The dial impulse information originating from the station will then appear on lead 452 of the regiser 60 which is the register talk path. This point is normally high as a result of drive current supplied through resistor 454. When the station user is first connected to the register, a high occurs at the output of NOR-450 which drives transistor 458 into saturation so that dial tone is connected to the lower end of capacitor 60. This is then coupled back through the register talk path to the originator.

When the originator dials his digits, he places lows on the register talk path 452 which are responded to by switch amplifier 462 and 464. In the quiescence state, transistor 462 is held in saturation. The resultant collector current flows through the base emitter junction of PNP transistor 464 holding this transistor in saturation also. The result is that +5 appears at the collector of transistor 464. This voltage is then a source of drive current for transistor 466. Transistor 460 is then driven into saturation so that the emitter voltage on transistor 462 is approximately three-tenths of a volt. When a low occurs on lead 452, transistor 462 is biased into cutoff. Since there is no longer base current on transistor 464, it switches into a cutoff condition also. The output of this switch amp then goes to a low level which is fed back to the input through capacitor 468 and resistor 470 which dictates the maximum toggling rate for the switch amp. Also, transistor 466 is biased into cutoff so that the emitter of transistor 462 assumes a potential which is dicated by the 2K and 3K resistor which forms a divider so that once the device is switched to an OFF condition, the emitter potential would be approximately 2 volts. The effect of transistor 466 is to put hysteresis on this switch amp so that it is more immune to noise and other effects which can be present on a register talk path.

This signal is then connected to inverter 472 which is inverted a second time in invertor 474. The delay following invertor 474 is part of an end-of-digit detector 476. During the interval in which dial pulses were being received, the altenate highs and lows appearing at transistor 472 appear at the output of NOR-478 on an inverted basis. This information is then connected to the units and tens counters 480 and 482 which perform the function of digit storage. The overall timing of these circuits allows for a broad range of dial duty cycles and impulse rates.

If digit tone receivers are used in conjunction with this register, the switch amp consisting of transistors 462 and 464 is not required. Instead the digital information representing the number being dialed appears at lead 484 which then energizes NOR-478 through inverter 486. This then supplies pulses at the output of NOR-478 at a much higher rate than what is encountered in normal impulse dialing and this information is then stored just as if it had originated from a rotary dial. At the end of dialing, as determined by the digit tone receiver, a high will appear on lead 488 of the register 60 which energizes the base circuit of transistor 490. This drives transistor 490 into saturation which diverts the base current supplied to transistor 492 through resistor 494 and the output of transistor 496. Transistor 492 then is forced into a cutoff condition so that its collector goes high. Shortly thereafter the End of Dial (EOD) signal on lead 488 terminates so that transistor 496 again assumes a saturation state causing it to assume a low at its output.

c. Digit Counter

Each time end of digit occurs as described above, Flip-Flops 421 are clocked. The combination of these two Flip-Flops 421 represents a divide by four counter. When the register is idle, a high will appear at the output of NAND-423 causing a low to appear on the reset leads of both of the flip-flops 421, owing to the action of inverter 425. This causes the Q outputs of both flip-flops to go low so that two highs appear at the input to NAND-427 causing its output to go low. This level then appears at the input to NOR-456 so that its output goes high causing transistor 458 to be biased into saturation which connects dial tone into the register talk path. The output of NAND-427 also supplies a low to the input to NAND-429 causing its output to go high. This high then appears on the enable leads of counter 480. When dialing occurs, the dial pulses will appear at lead 431 of NAND-433. By double inversion, these pulses will then appear on the clock lead of counter 480. After the first digit, the Flip-Flops 421 are toggled so that a low will appear at the output of NAND-435. This then enables counter 482 through NAND-437 in a similar manner to that which was just described.

Also, since a low is now present at the input to inverter 439, a high will appear at its output which enables four NANDS-441. During the next count, a low appears at the output of NAND-443 which then enables four NANDS-445 and places a high on the enable lead of counter 447. This counter is used in connection with the toll restrictor and other three digit dialing features. Once a low appears at the output of NAND-449, the counter is no longer able to advance. This low causes a high to appear at the output of inverter 451 which holds transistor 492 into saturation.

d. Data Output

When the digit counter was on the count of one, NAND gates 441 were enabled as described previously. This caused the Q outputs from counter 480 to appear at leads 453, 455, 457 and 459 by double inversion. Thus, during the count of one, the output of counter 480 is presented to the data leads for sampling by the link. Also at this time, a low is present at the upper input to NOR-461. A low will also appear at the lower input to NOR-461 as a result of the differentiating action of capacitor 463 which momentarily holds the upper input to NOR-465 low causing its output to go high. Inverter 467 causes the momentary low to occur. Since two lows are now present at the input to NOR-461, its output momentarily goes high causing the $10^1$ clock lead which is lead 469 of the register 60 to momentarily go low. This causes the data output from the register to be loaded into the link 30 which is connected to this register.

When the second digit is dialed, NANDS-445 are enabled in a similar manner so that the output of counter 482 is presented at the data leads. In this case, NOR-471 is enabled so that the $10^0$ clock lead of the register is momentarily brought to a low condition. When the output of NOR-471 makes the transition from high to low, a momentary low occurs at the input to NOR-473 causing its output to go high. This causes a simultaneous occurrence of two highs at the input to NAND-475 so that its output momentarily goes low. This is the end of dialing signal which is connected to the link 30 being used for this call and initiates the connect function by setting the EOD flip-flop 312 in the link 30 (FIG. 4). The outputs of counters 480, 482, and 447 are presented on a parallel basis through NOR's 477, 479 and 481 as shown. These data outputs are used in connection with certain optional features indicated above the outputs and described elsewhere.

e. 10 Second Timer

One shot multivibrator 483 is arranged in such a manner that its time-out period is 10 seconds. When the register is connected to a link, a low appears at lead 485 of the multivibrator 483 which initiates the timing cycle. As dialing occurs, the output of NOR-478 goes high and low in accordance with the dialed information. These highs and lows then appear at the input of lead 487 of multivibrator 483. Each time a low occurs at this point, followed by a high, the multivibrator 483 is retriggered so that a new 20 second time-out period results. If 10 seconds occurs without a break in the signal appearing on lead 487, the timer times out causing its Q output to go high. This then appears at the input to NOR-489 which clocks Flip-Flop 430 disconnecting the register from the link being used for this call. In addition, when the Q output goes low, a corresponding level will appear at the input to NOR-491. The remaining input to this NOR will also be low because the register is presently connected to a link. This causes a high to appear at the output of NOR-491 so that lead 493 of the register which is the released lead will momentarily go low. This causes the link to release any crosspoints which are connected to it and assume an idle condition.

f. Hunting

When hunting is requested by the link being used for this call, a momentary high will appear on lead 501 of the register 60. This then drives transistor 503 into saturation so that a low appears at its collector. Inverter 505 causes a momentary high to occur at the input to NOR-507 so that its output goes low. This signal then clocks Flip-Flop 509 into the one state causing its Q output to go high. The Q output of Flip-Flop 509 is connected to lead 511 of one shot multivibrator 513 which by virtue of the feedback resistor 515 and capacitor 517 operates as a clock. Therefore, when lead 511 is high, pulses will appear at the Q output multivibrator 513. These pulses simulate the end-of-digit signal which would normally occur while dialing.

When transistor 503 was first operated causing a low to occur at its output, transistor 531 was temporarily biased into cutoff. The resultant high in its collector then caused a low to appear at the output of NOR-537. When capacitor 539 discharges, a high will then appear at the clock lead of counter 482. This advances the counter by one count from whereever it was in the first place. If carry is required, assuming the hunting goes from 19 to 20 or similar combinations, a carry pulse is delivered to counter 480 through the differentiating network consisting of capacitor 543. Flip-Flops 421 are then clocked by multivibrator 513 just as if dialing was occuring except that it happens at a much higher rate. When EOD occurs, as a result of operating the digit counter 421, a momentary high appears at the output of NOR-473 as explained above. This high then causes a low to appear at the reset lead of Flip-Flop 509 which terminates the hunt cycle. Since Q now goes low, multivibrator 513 can no longer retrigger. During the time when Flip-Flop 509 was in the set condition, its Q output was low, causing a high to appear at the outputs of NAND-429 and 433. This is necessary so that the counters 480 and 482 will be enabled at this time. The new number which is in these counters is then loaded into the link in a rapid manner similar to that which was just described when normal dialing occurs.

g. Direct Station Selection

When the attendant extends a call through direct station selection, a high will appear on lead 551 of the register, indicating which of the registers 60 through 60Z is to be used for the attendant call. The high on Pin 551 drives transistor 553 into saturation which causes a high to appear on lead 555 of NAND-557 by double inversion. This high also inhibits dial tone by energizing NOR-456, causing its output to go low.

When the scanner encounters the called termination number, a high will appear on lead 559 during the time slot of the called termination. This causes a high to appear at lead 561 of NAND-557 by the double inversion of transistor 563 and inverter 565. The output of NAND-557 then goes low during this time slot causing a high to appear at its output. This then causes a low to appear at the load leads of counters 480 and 482 so that the number which is presently in the scanner is loaded into these counters. When the highway signal terminates, the resultant low excursion at the output of NAND-565 causes a pulse to appear at the input to inverter 567 as will be described with reference to the DITA function. This causes the Flip-Flop 509 to be set and the number which is presently in counters 480 and 482 is loaded into the link which is used for this call.

h. Dial 0

If the first digit dialed into the register 60 is 0, this condition is decoded in one out of 10 decoder 571 so that a low appears at its 0 output. After the first digit is dialed, the output of NAND-435 will also be in a low condition so that two lows exist at the input to NOR-573 causing its output to go high. This then causes the output of NOR-575 to go low causing a corresponding level to appear on lead 577 of the register. This signals the link 30 to call the attendant. Logic for performing this function is accomplished in the link. Decoder 571 is also used in connection with 8 and 9 when these are the first digits dialed. These digits may be used for other functions. NAND-565 prevents loading these numbers in the link when they are dialed into the register.

i. Typical Call

Referring now to FIG. 5, the function of the Register 60 will be explained as it performs to complete a typical call.

When a register signal is initiated by a link, a low will appear at the RAAC inputs (leads 401 to 408) corresponding to the link requesting service. Assume a low occurs on lead 401 which is Link 30Z. This will result in a high appearing on lead 409 as soon as the register answer circuit is able to connect to this particular link. The originating party is then connected to this link through the register talk path in the link being used for this call. Since the register is in a reset condition, the digit counter consisting of Flip-Flops 421 is in a reset state so that three lows appear at the input to NOR-456 which causes dial tone to be returned to the originator. When the originator dials the desired termination number, the impulse dial information will appear at the output of NOR-478 and these pulses are then counted by counters 480 and 482, depending upon whether the first or second digit is being dialed as dictated by counters 421. Each time the dial pulse chain is interrupted for a sufficient period of time for capacitor 573 to recharge, an end-of-digit signal will occur as evidenced by a low appearing on the collector of transistor 492. This advances the digit counter 421 to the next digit. After the first digit is dialed, a momentary low will occur on lead 469 of the register which causes the BCD data output presently presented by the register on leads 453, 455, 457 and 459 to be loaded into the link being used for this call. When the second digit is dialed, a similar pulse occurs on lead 575 which loads the information in counter 482 into the appropriate section of the link number store. After the $10^0$ clock pulse occurs, a momentary low appears at the EOD output of the register which signals the link to initiate a call to the termination number presently in storage.

The link then returns a register release signal on lead 577. When normal connect occurs, lead 577 will go high during the time slot of the connected termination. A high at this point causes a low to appear at the collector of transistor 579 which by inversion causes a high to appear at the output of inverter 581. This then causes a low to appear at the output of NOR-583 so that when register release goes low a low will appear on the clock lead of Flip-Flop 509. This then clocks a one into the flip-flop which disconnects the register answer circuit from the link which was originally connected to since the Q output now goes low. NOR's 427, 435, 443 and 449 no longer receive an input signal from Flip-Flop 509 so that the RAAC signal on leads 409 through 415 is no longer present. When Flip-Flop 509 is clocked, a high appears at the upper input to NOR-585 which then resets the digit counter and register counters back to zero. The register is now ready to accept the next call.

DIRECT INWARD TRUNK ACCESS

Direct Inward Trunk Access Circuit (DITA) 66 enables a trunk call to be connected to a predetermined station without attendant assistance. Only one DITA circuit 66 is required for the PBX 10 and the information from the DITA circuit is fed directly to one of the register circuits 60 through 60Z.

Portions of the direct inward trunk access (DITA) circuit 66 (FIG. 1), are located in the line circuitry (FIG. 4), the Register Circuitry (FIG. 5), as well as the trunk circuitry (FIG. 2). To gain a better understanding of DITA, reference is made to FIG. 6 which comprises a simplified block diagram of DITA circuit 66 including those portions which form a portion of the link, register and trunk circuits described previously.

When a trunk which is patched for DITA (patch 105, FIG. 2) is connected to a link, the DITA highway is high at the time of link seizure. An AND gate 601 in the trunk circuit 100 decodes the time slot of the number assigned to the trunk. Since crosspoint firing occurs during this time slot, the DITA highway 603 will be high at the instant the allotted link becomes busy. A common highway amplifier 605 provides fan out so that many links can be used.

The D Lead of DITA Flip-Flop 607 is high because it is tied to the DITA highway 603. When the link becomes busy, the clock lead of DITA Flip-Flop 607 goes high after the D lead by a delay time equal to the time required to operate and sense closing of the allotted crosspoint. Once the DITA flip 607 is set, this information is retained until the flip-flop 607 is later reset which occurs when DITA signalling is no longer required. The Q lead of the DITA flip-flop is now high which inhibits normal attendant request routines and instead requests a register 60 (RAAC signal described above). Once the register 60 answers, a high will appear at both inputs to AND gate 609 and the originator (outside trunk party) will hear a short burst of dial tone. The connected register 60 is now awaiting dialing which will be done via the DITA option 66.

AND gate 609 initiates the DITA number fetch by clocking a 1 into Flip-Flop 611 which causes a high to appear at the lower input to AND gate 613. The upper input to AND gate 613 is driven by AND gates 615 which supplies a high when coincidence occurs between the scanner 56 and the DITA station patch circuit 617. AND gate 613 then energizes a one shot multivibrator 619 during the time slot of the desired DITA station. Multivibrator 619 momentarily pulses the register load lead 621 so that the current number presented on the scanner leads **56*a* and 56*b* is locked into counters 623 and 625. When multivibrator 619 times out, one shot multivibrator 627 is triggered which resets Flip-Flop 611** which is no longer required.

The station numbers now contained in counters 480 and 482 which are part of the register 60 corresponds to the desired DITA station and it is still early in the time slot. When one shot multivibrator 619 timed out, a link transfer sequence was initiated by timing circuits 629 in the register 60. This is the same timing routine used in normal dialing. Timing Circuits 629 then cause the DITA station number to be loaded into the same link described above which also is a normal routine. the link then completes the call. When the register is no longer required, the link initiates register release which resets Flip-Flop 607 which is also no longer required.

Referring now to FIGS. 2, 4, 5 and 7, the detailed operation of DITA circuit 66 will now be explained.

The DITA capability is patched into the desired trunks by means of a patching diode 105 located on the trunk 60 (FIG. 2). If the trunk in question is part of a DITA group, the DITA highway will be high at the time the trunk seizes a link. This resultant high on lead 602 of the link (FIG. 4) causes a high to appear at the D lead of DITA Flip-Flop 607. When the link becomes busy, link busy signal goes low causing the output of inverter J1 to go high. Resistor R15 and capacitor C5 form a time delay network which allows the DITA highway time to settle down before clocking occurs.

If the DITA highway was high at the time the link was seized, a high will occur on the Q output of Flip-Flop 607 and a low will occur on the Q output of Flip-Flop 607. This low then appears at the input to NOR-AK-3. The centered input to NOR-AK-3 will also be at a low at this time since the register 60 is presently connected to this link. The lower input to NOR AK-3 will also be low because a through connection has not yet been established since only one crosspoint is connected to this link. This results in a high appearing at the output of NOR-AK-3 which energizes a DITA buss 610 through coupling diode CR-16. This activates the DITA circuit 66. Since the incoming circuit must have been a trunk in order for the DITA Flip-Flop 607 to have been set, two highs will occur at the input to NAND-P1 causing its output to go low. This then forces the output of NAND-P2 to go high so that the output of NOR-H2 goes low which sets the register request Flip-Flop AA.

Figure 6:
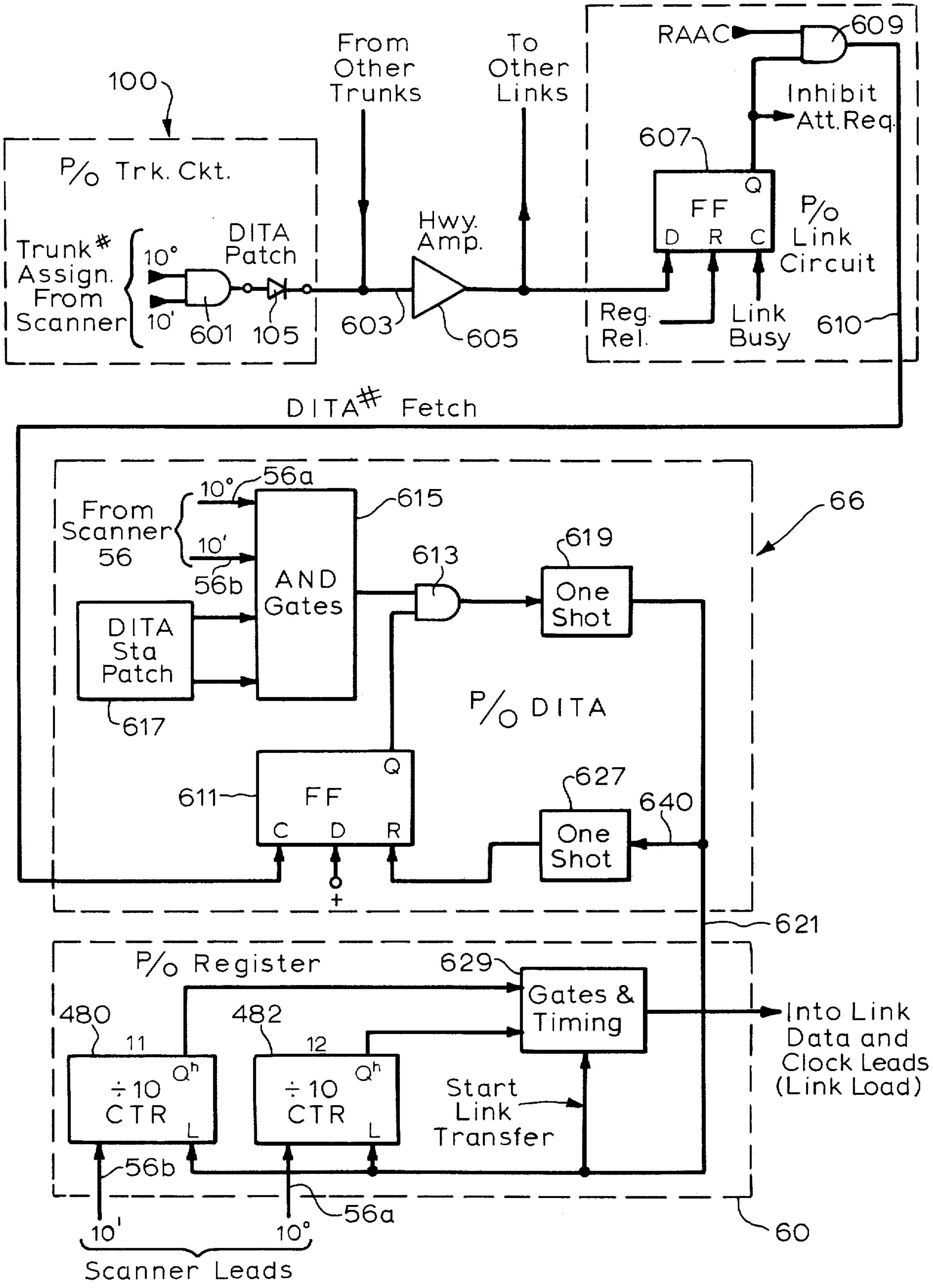
FIG. 6 is a block diagram of the direct inward trunk access circuit shown in FIG. 1.
Figure 7:
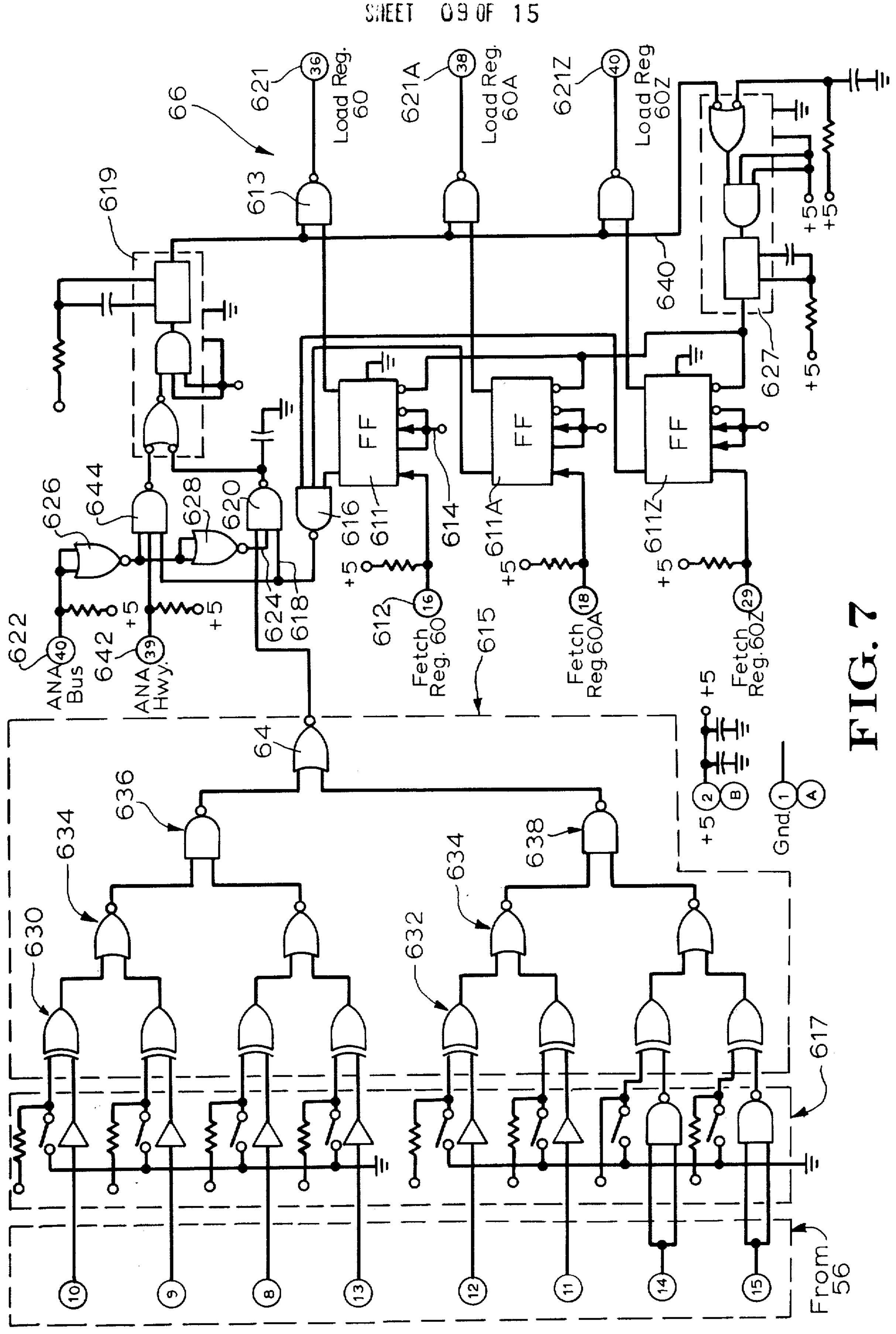
FIG. 7 is a schematic diagram of the direct inward trunk access circuit shown in FIG. 6.

The signal on DITA buss 610 is a number fetch command which triggers Flip-Flop 611 (FIG. 6). Referring to FIG. 7 it can be seen that a Flip-Flop 611 through 611Z is associated with each register in PBX 10. Assume that register 60 has generated a number fetch command, a high will then appear on lead 612 which clocks a one into flip-flop 611. This occurs because the lead 614 of the flip-flop is connected to +5. The Q output of Flip-Flop 611 will then go to a high state which places a corresponding level at the lower input to NAND-613. The Q output of the flip-flop will then go low so that a high appears at the output of NAND-616. A high then appears at lead 618 of NAND-620. The second input to NAND-620 is also high because the ANA buss 622 is also high at this time. The high on lead 620 results from double inversion of NOR gates 626 and 628.

When the number in the scanner 56 matches the DITA number patch 617, exclusive OR gates 630 and 632 will simultaneously all deliver lows to NOR gates 634 causing their outputs to go high. The resultant highs at the inputs to NAND gates 636 and 638 cause their outputs to go low during this time slot. This causes two simultaneous lows during the desired DITA station number time slot appearing at the input to NOR 640 so that its output goes high at this time. NAND-620 now has three simultaneous highs at its input causing its output to go low. This triggers the one shot multivibrator 619 which delivers a high on its Q output for approximately 80 microseconds. NAND-613 then has highs at both of its inputs causing the load command on lead 621 for Register 60 to go low. The low appearing on lead 621 forces the number presently in the scanner 56 to be loaded into the register 60.

When one shot multivibrator 619 times out, a low then appears on lead 640 of one shot multivibrator 627 causing it to trigger. The Q output of multivibrator 627 then goes low for approximately 80 microseconds which resets the number fetch Flip-Flop 611. The DITA number has now been loaded into the register 60 and the DITA feature is no longer required.

Inputs leads 622 and 642 are used in connection with the ANA circuit 74 which triggers one shot multivibrator 619 during the time slot of the assigned night answer station rather than the DITA station. If ANA is required, a low will appear on lead 622 which causes a corresponding level to appear at lead 624 of NAND-620. This disables the DITA function. At the same time by inversion, inverter 626 will supply a high to NAND-644. When number fetch occurs for any of the registers, a high will appear at the lower input to NAND-644 as a result of one of the flip-flops 611 through 611Z being in a set condition. When the ANA station time slot occurs in the scanner 56, a high will appear on lead 642 of the DITA circuit 66 which supplies the third and final input to NAND-644 causing its output to go low which then triggers multivibrator 619. The ANA station number is then loaded into the appropriate register and the number fetch flip-flops 611 are reset which was done for DITA.

Referring now to FIG. 5, the last portion of DITA will be explained. When DITA is required, as determined by logic in the link, a high will appear on lead 610 (FIGS. 4 and 5) of the register 60 which momentarily drives transistor 650 into saturation. The resultant low in its collector causes a high to appear at the lower input to NOR 652. This causes the output of NOR-654 to go high. Since NORS 642 and 654 are arranged as an RS flip-flop, the resultant high appearing on lead 612 of the register causes the DITA number fetch cycle to begin as a function of this feature.

When the DITA station number occurs in the scanner, a low will appear on the load lead 621 of the register, causing the output of NAND-557 to go high. By inversion, a low appears at the output of inverter 656 causing counters 480 and 482 to load the number which is presently on the set leads of these counters. When the load signal on lead 621 ends, the output of NAND 658 will again go low causing a momentary low to appear at the input to inverter 561. The duration of this low is determined largely by capacitor 658. By double inversion, a low momentarily appears at the lower input to NOR-654. This resets the Flip-Flop 654 and 652 which terminates the DITA number fetch.

Inverter 561 also supplies a momentary high to NOR-567 which clocks Flip-Flop 509 so that one shot multivibrator 513 is allowed to operate. The number which is presently in counters 480 and 482 is then loaded into the link 30 as was described under hunting. In this case, however, transistor 531 is not operated so that N+1 does not occur.

ASSIGNED NIGHT ANSWER

The assigned night answer (ANA) circuit 74 is a feature which by means of predetermined patching causes inward calls on any one of a preselected number of different trunks to go to predetermined stations. For example, Trunk No. 1 can be patched to Station A, Trunk No. 2 to Station B, etc., in any combination desired. Furthermore, more than one trunk may be assigned to a single line as determined by patching. As will become evident below, the stations which are assigned to the given trunks at night may still be used as intercoms to call other statins and may receive calls from other stations.

Figure 8:
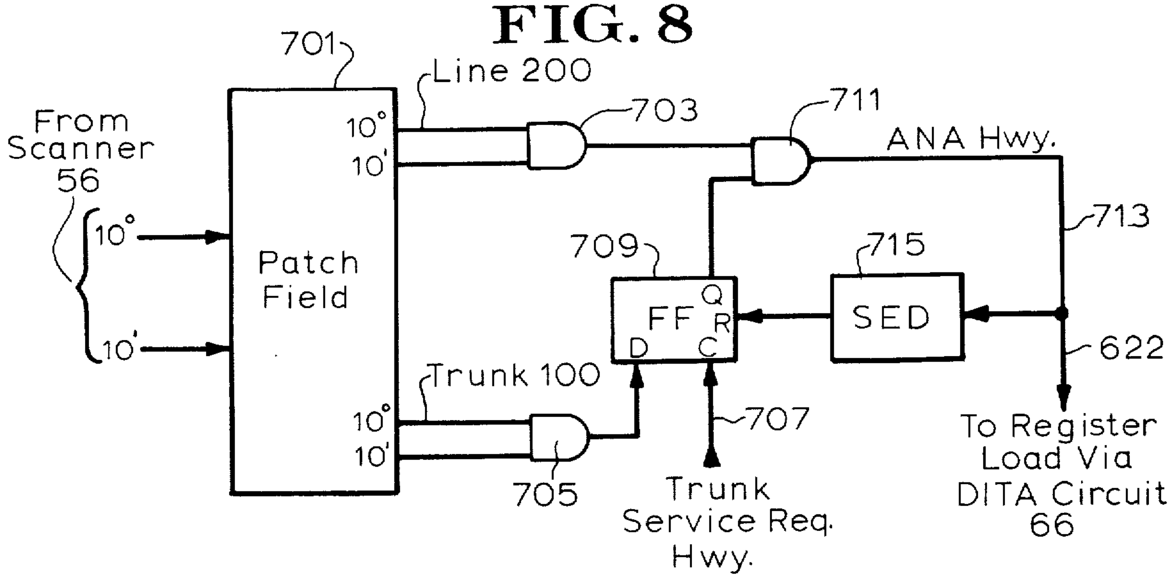
FIG. 8 is a block schematic diagram of the assigned night answer (ANA) circuit shown in FIG. 1.

Referring now to FIG. 8, ANA circuit 74 will be explained. Only one ANA circuit 74 is shown. However, it will be recognized that one ANA circuit 74 is required for each night trunk-line pair desired. Decimal scan leads for units and tens from scanner 56 are presented a the left side of the patching field 701. The desired number of assignments are then patched to AND gates 703 and 705 which diode individual time slots for the associated terminations. AND Gate 705 establishes the trunk number and AND gate 703 establishes the line number to be called.

When an inward call occurs a high will appear on the trunk service request highway 707 (FIG. 2) during the time slot of the seizing trunk. This causes a high transition to occur on the clock lead of Flip-Flop 709 at the outset of the time slot. (In practice, a small delay is added to overcome pulse skewing which would otherwise occur.) At the time the clock lead makes a high transition, the D lead of Flip-Flop 709 is already high so that a 1 is clocked into the Flip-Flop 709. This results in the associated Q lead going high on a sustained basis. This energizes the lower input to AND gate 711. When the scanner 56 encounters the number patched for AND gate 703 (the desired line) a time slot high will appear at the output of AND gate 711 which energizes the ANA highway 713. This high-way then triggers the DITA circuitry via lead 622 (FIG. 7) described previously. The result of which is to lead the desired termination number into the register 60 which then transfers the number to the link 30 which completes the call as previously described.

At the end of the time slot pulse appearing on the ANA highway 713, a conventional end detector 715 delivers a short pulse which resets Flip-Flop 709 terminating the cycle.

UNIVERSAL NIGHT ANSWER

Universal night anser is an option feature which allows any of the station users connected to the PBX 10 to answer inward night calls from all trunks. Station users answer these calls by dialing an access code 79 which then connects them to this trunk party so that they may subsequently transfer to another station. When an inward call occurs on UNA, a central ringer or system of bells is caused to ring so that it can be heard anywhere on the premises of the area served by the PBX.

Figure 9:
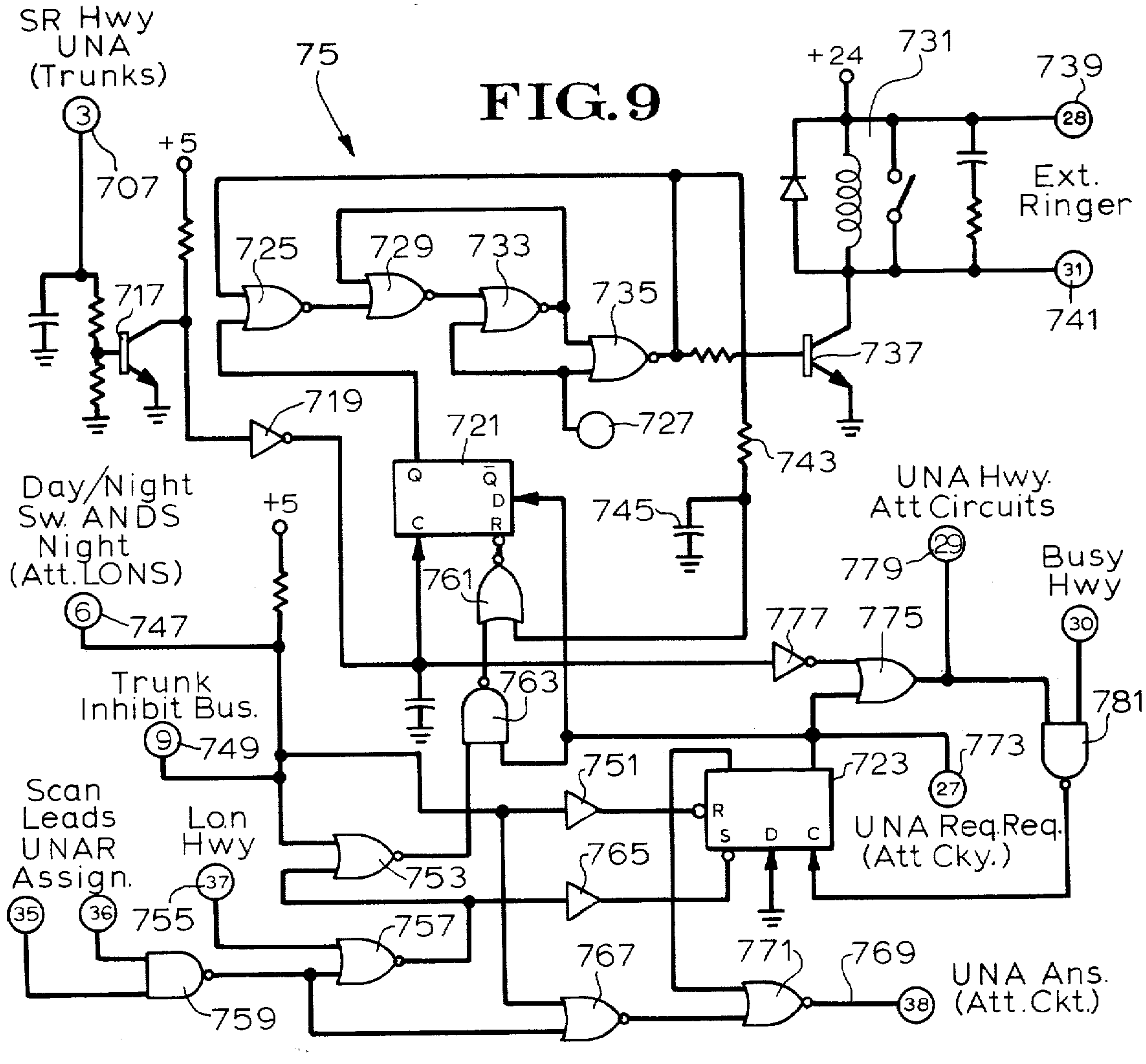
FIG. 9 is a block schematic diagram of the unassigned night answer (UNA) circuit shown in FIG. 1.

Referring now to FIG. 9, Universal Night Answer Circuit (UNA) 75 will now be described.

The initiation of a UNA call occurs as a result of a high appearing on the service request highway 707 (FIG. 2) for UNA. The resultant high causes a low to appear on the collector of transistor 717 so that the output of inverter 719 goes high. This supplies a clock pulse to Flip-Flop 721. The D lead of this flip-flop will be in a high state if Flip-Flop 723 was reset which is normally the case. This causes the Q output from Flip-Flop A to go high so that the output of NOR-725 goes low. If the ring signal interrupt buss, lead 727 is high at this time, a low will appear at the second input to NOR-729 causing its output to go high. A high on the ring signal interrupt buss 727 means that the timer is not attempting to gate ring signal at this time. This logic function is required so that Relay 731 is not energized in the middle of a ring burst which might otherwise cause arcing of the contacts. Since the output of NOR-729 is now high on a sustained basis, the output of NOR-733 will be low on a sustained basis as a result of the flip-flop action. The next time the ring signal interrupt buss 727 goes low, two lows will appear at the input to NOR-735 causing this output to go high. This drives transistor 737 into saturation which energizes Relay 731 closing the external ringer contacts. The resultant closure across leads 739 and 741 then operate the external ringer circuit.

During the time when the output of NOR-735 is high, a corresponding signal is applied to the input of NOR-727 so that if Flip-Flop 721 is reset at this time, the ring signal will continue until a full burst is sent outward. This again avoids opening the relay contacts of 731 between ring bursts. The output of NOR-735 also supplies a high to the right hand input of NOR-725 through delay resistor 743 and capacitor 745. This supplies reset to Flip-Flop 721 so that if the trunk party abandons the call prior to its being answered, the external ringer will stop.

When the day/night switch as the attendant's console is in the night position, a ground is applied to lead 747. This signal is used to actuate the UNA circuit 75. In addition, lead 747 is shorted to lead 749 which is connected to the trunk inhibit buss so that inward trunk calls are not possible while the UNA circuit is activated. The trunk calls are not allowed until a preselected access code 79 is dialed. At this time, the UNA circuit will cause the link involved in this call to connect to the incoming trunk circuit rather than allow it to come in through normal incoming seizure means through the link allotter circuit. When the day/night switch is in the night position, the low appearing at the input to inverter 751 causes its output to go high which removes reset from Flip-Flop 723. This input from the day/night switch also supplies a low to the upper input of NOR-753 so that this gate can be activated.

When a station user wishes to answer the UNA call, he dials the preselected access code which is then loaded in the link which he has seized. The link then attempts to connect to termination 79 (the preselect access code termination) and produces a low on the connect highway 755 during time slot 79. At this time, both of the inputs to NOR-757 will be low. This is because the time slot 79 is decoded by NAND-759. When both of its inputs are high, its output then goes low. The output of NOR-757 then supplies a high to the input of NAND-759 causing its output to go low. This then supplies a high to the left hand input of NOR-761 due to the inverting action of NAND-763. This signal then resets Flip-Flop 721 so that ringing is no longer going to occur. The high which appeared at the output of NOR-757 is also supplied a high to the input of inverter 765 causing its output to go low. This sets Flip-Flop 723 so that its Q output goes high.

When 79 was originally decoded, two lows appeared at the inputs of NOR-767 so that its output went high. This high then caused the UNA answer lead 769 to go low. This signal causes the attendant circuit to connect to the link which is requesting service. The link which will be requesting service at this time is the one into which the access code 79 was dialed. This is because 79 is not a valid number and the equipage highway is low at this time. Therefore, the link will respond to this as an intercept call which originates a service request signal to the attendant.

When Flip-Flop 723 was set causing its Q output to go high this signal caused a sustained high to appear at the upper input to NOR-771 so that lead 769 will remain low even after the time slot 79 has ended. This is necessary so that the UNA call is completed before the scanner again encounters 79 and disconnects the attendant from this call. When Flip-Flop 723 was set, a low appeared on UNA register request lead 773 which is connected to the attendant circuit. Once the attendant circuit is connected to the link requesting service, a low appearing on this lead 773 will cause the attendant circuit to request the appropriate register for this call.

Q output from Flip-Flop 723 also supplies a low to NAND-763 so that reset is maintained on Flip-Flop 721 even after the time slot 79 has ended. The Q output also supplies a low to the D lead of Flip-Flop 721 so that the next time the service request highway is activated, a zero will be clocked into Flip-Flop 721 rather than a one. The Q output of Flip-Flop 723 also supplies a low to the lower input to NOR-775. When the time slot for the trunk requesting service again goes high as evidenced by a high appearing on lead 707, transistor 717 will again be driven into saturation, resulting in a high appearing at the output of inverter 719. This high will then appear at the input to inverter 777, causing its output to go low. At this time, both of the inputs to NOR-775 will be low so that its output will go high. This time slot which is present on lead 779 identifies the number of the originating trunk. Circuits in the attendant's circuit cause the time slot presently occurring on lead 779 to be loaded into the register used in conjunction with the link which was seized for this call. The register then leads that number back into the link number store and the link executes a connect to that number. When the trunk becomes busy, two highs will appear at the inputs of NAND-781 causing its output to go low. At the end of the time slot, these highway signals will both go low again causing the output of NAND-781 to go high. This clocks a zero into Flip-Flop 723 resetting it to terminate the UNA answer cycle.

When the day/night switch is in the day position, a high appears on lead 747 and lead 749 of the UNA feature. This allows inward trunk calls to occur by removing the inhibit signal from the trunk inhibit buss 749. Also, the high present at lead 747 appears at the input to inverter 751 which maintains reset on Flip-Flop 723. This high also appears on the input to NOR-767 which maintains a low on the output of NOR-767 so that lead 769 cannot be placed in a low condition. The high on lead 747 also appears at the upper input to NOR-753 causing its output to go low which ensures that the output of NAND-763 will remain high which supplies a sustained reset signal to Flip-Flop 721. This logic entirely disables the UNA feature during the day mode.

TOLL RESTRICTOR

Referring to FIG. 5, if a call is potentially toll restricted as dictated by class marks 103 (FIG. 2) and logic within the link 100, a high will appear on lead 801 of the register 60 (FIG. 5) at the time of connect; that is, when the link connects to an outgoing trunk. This high then causes transistor 803 to be driven into saturation which results in a high appearing at lead 805 of NOR-585. This causes the output of NOR-585 to go low momentarily which applies reset to counters 480, 482 and 447. NORs 807 and 809 form an RS flip-flop which remembers that a potentially toll restricted signal has occurred on lead 801 of the register. Since the register is now reset so that the EOD counter is also at zero, dial tone would normally be returned to the originator. However, in this case, dial tone should not be returned because the originator is instead hearing dial tone from the Central office to which this call is connected. The output of NOR-BB02 is in a high state as a result of the set signal described above which causes a high to appear at the lower input to NOR-456 which prevents dial tone from being sent back to the originator. At this point, the originator dials the first three digits of his normal public network number and the three digits are stored in counters 480, 482 and 447. After the third digit is dialed, a low will appear at the output of NAND-449. This then appears at the upper input to NOR-811. The lower input to NOR-811 is also low at this time because of the high which is present at the input to inverter 813 resulting from setting of Flip-Flop 807 and 809. A high then results on lead 815 of the register which is the toll restrictor request lead.

At this point, the toll restrictor 68 (FIG. 1) is summoned to check the number which is currently in this register against the number which are stored in the toll restrictor list in the form of patching in conventional manner. If a match occurs, the toll restrictor 68 will supply a momentary low on lead 817 of the register which resets Flip-Flop 807 and 809. If the dialed digits do not correspond to any of the numbers stored in the toll restrictor, a momentary low will occur at lead 819 of the register. This causes a high to appear at the upper input to NOR-821 which applies a momentary low to lead 493 of the register which releases the link which is used for this call. A call of this type is blocked by link release. After the block signal occurs, the toll restrictor 65 then returns a reset signal on lead 817 so that normal register operation will follow.

When a high initially appeared at the input to NOR-807 causing its output to go low, a sustained high resulted at the output of NAND-823 which ensures the Flip-Flop 430 will not be clocked by the register release signal originating in the link. This signal will occur at the time the link connects to the outgoing trunk and must be inhibited so that the register is not disconnected from the link which is potentially toll restricted. Also, when the RS Flip-Flop 807 and 809 was in a set condition, a high appeared at the lower input to NOR-473 which prevents EOD from being returned to the link being used for this call. This is necessary so that the first two digits dialed in the three digit public network access code are not loaded into the link and misinterpreted as a local termination number.

PRESET CONFERENCE

Figure 10:
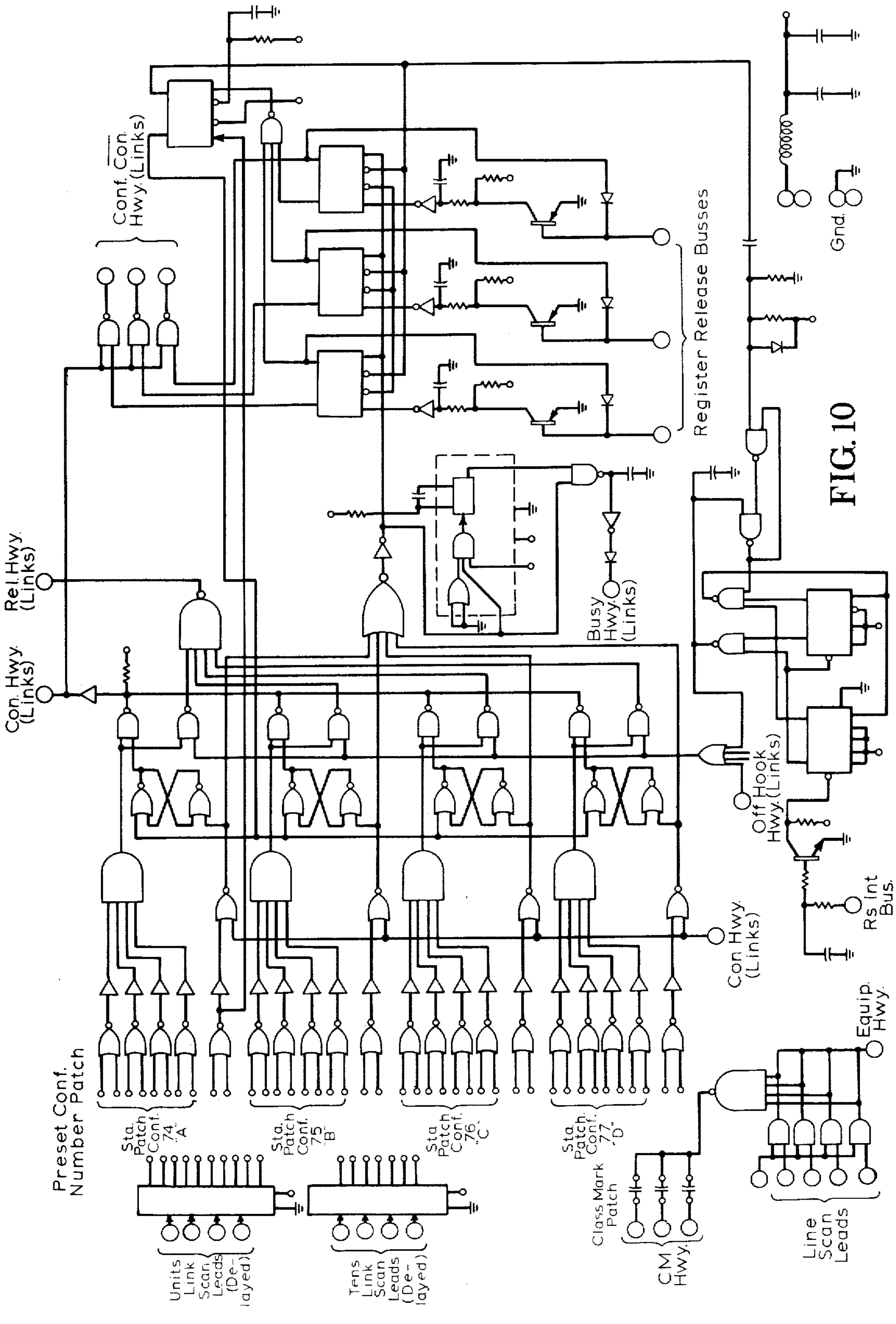
FIG. 10 is a schematic diagram of the present conference call circuit shown in FIG. 1.

FIG. 10 discloses one embodiment of preset conference circuit 72. The preset conference circuit 72 allows station users to dial preselected access codes 74 through 77 and call up to four conferees merely by dialing one of these two digit access codes. The conferences marked A, B, C, and D in FIG. 10 are predetermined by patching of wires in a conventional manner. When one of these access codes is dialed, the preset conference feature connects to all of the stations which are patched for that conference. Stations are then rung three times. If these stations fail to answer within three rings, they are then released from the conference. Stations which do answer are then placed in conference. The conference calls are completed through the register 60 and link 30 with logic circuitry similar to that described above in describing the operation of register 60 and link 30 for completing a call.

TRUNK SPLIT AND RECONNECT

As mentioned previously, the PBX provides the capability of splitting a circuit between a first and second termination, completing a circuit between a third termination and the first termination and then either replacing the third termination with the second termination or completing a circuit between all three terminations. Portions of the circuitry to accomplish this function are associated with Trunk Circuit 100 in FIG. 2 and Link Circuit 30 in FIG. 4.

Figure 11:
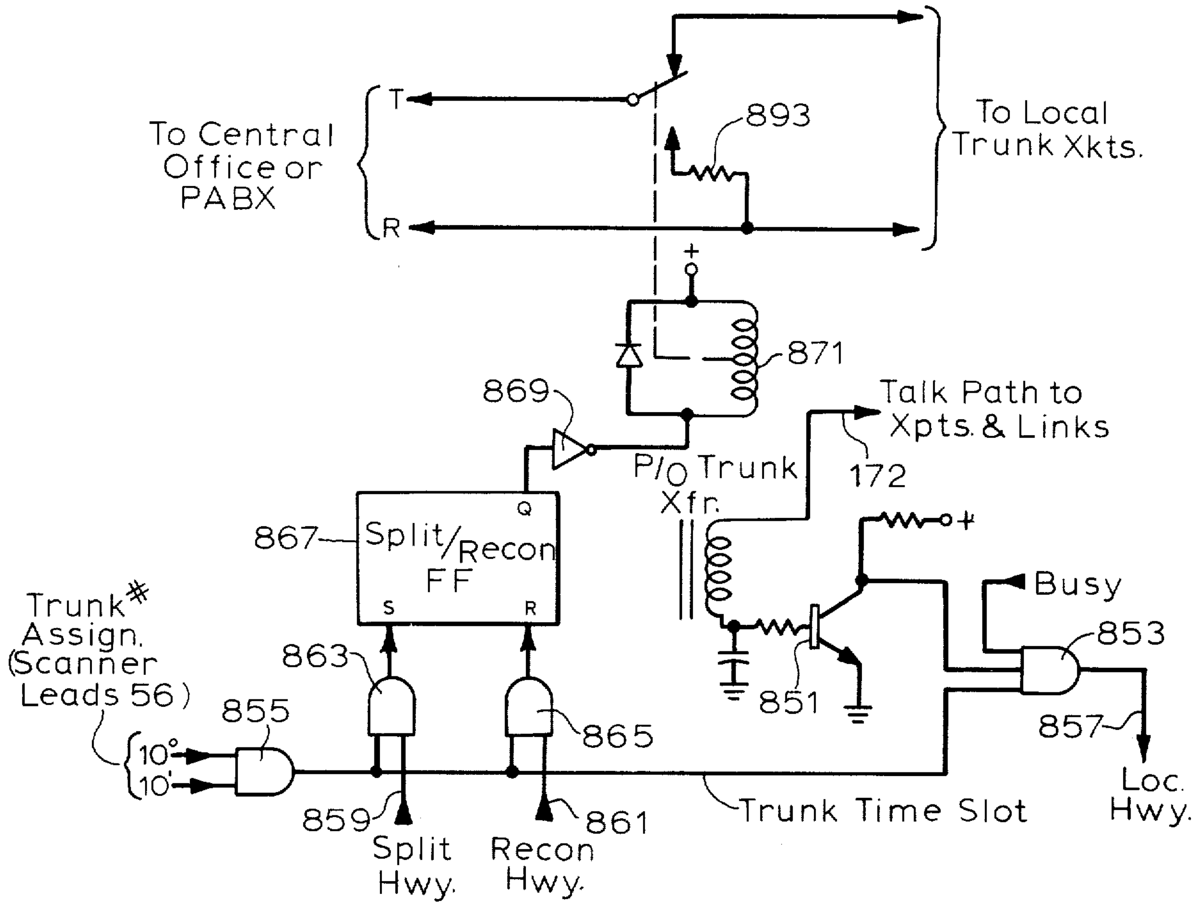
FIG. 11 is a block schematic diagram of a portion of a trunk circuit for responding to trunk split and reconnect signals.
Figure 12:
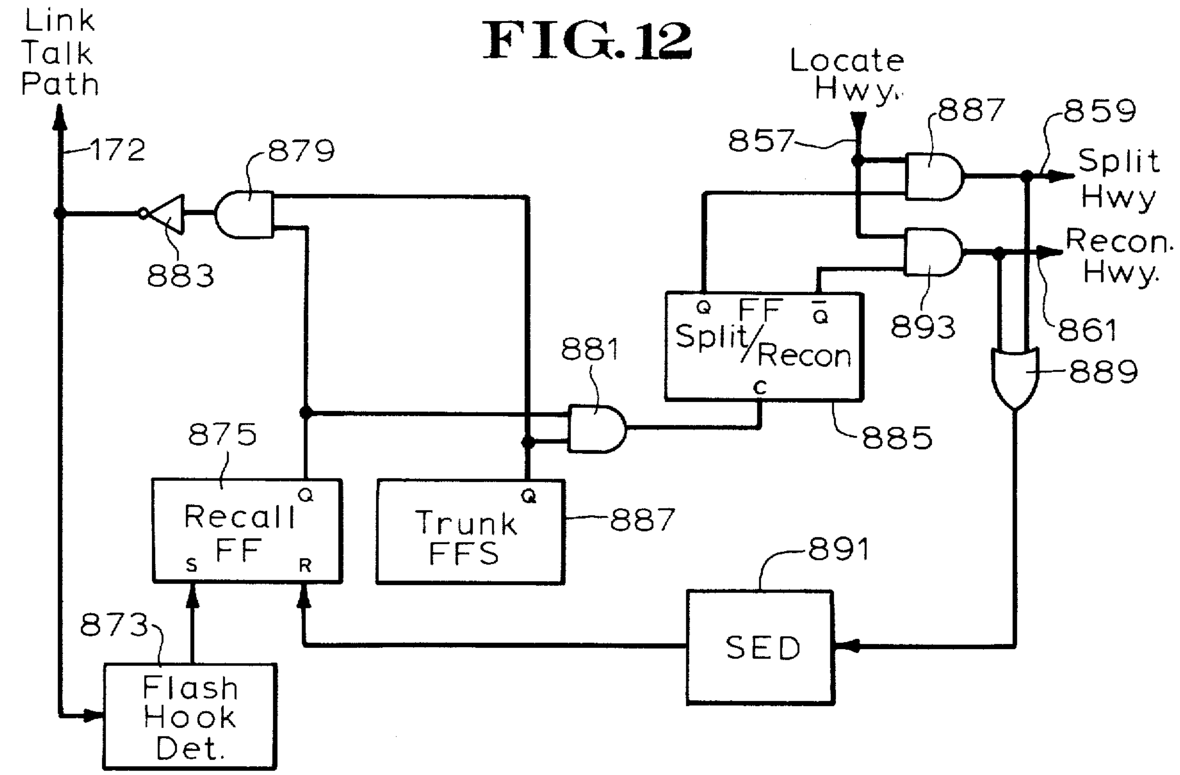
FIG. 12 is a block schematic diagram of a portion of a line circuit for generating trunk split and reconnect signals.

Briefly, referring to FIGS. 11 and 12 which comprise schematic block diagrams of portions of trunk circuit 10 and link circuit 30, respectively, when split or reconnect signalling is called for, the link associated with the call places a momentary low on the talk path 172. Inverter 851 then supplies a high to AND gate 853. When the scanner 56 encounters the number assigned to this trunk, a high from AND gate 855 appears at the lower input to AND gate 853. The upper input to AND gate 853 is high since the trunk is busy. A high then appears on the locate highway 857 which identifies the termination number of the trunk which is connected to link from which split or reconnect is desired. Upon detection of the high on the locate highway 857, the link returns a time slot pulse on either the split highway 859 or reconnect highway 861 as required. AND Gates 863 or 865 then either set or reset Flip-Flop 867. When Flip-Flop 867 is set, a high appears at its Q output which then causes a low at the output of inverter 869. This energizes relay 871 causing the trunk talk path to be split. When Flip-Flop 867 is reset the relay 871 is de-energized so that the talk path is completed.

The initiation of the above sequence is initiated when a station user flashes his hook switch to signal trunk split or reconnect. A momentary low occurs on the link talk path 172. If the timing is of the proper duration, flash hook detectors 873 will set the recall Flip-Flop 875 causing its Q output to go high. If a trunk is connected to this link, a high will appear on the Q output of the trunk Flip-Flop 877. This causes highs to appear at the outputs of AND gates 879 and 881. AND gate 879 drives Inverter 883 which forces a low to occur on the link talk path 849 and this condition is detected in the connected trunk which returns a high on the locate highway 857 as described above. When the output of AND gate 881 went high, the split/reconnect Flip-Flop 885 was clocked to change state from wherever it was. If split is desired, a high will appear at the lower input to AND gate 887 so that the split highway 859 will be energized in accordance with the locate highway time slot. AND gate 881 also energizes OR gate 889 which drives the signal end detector 891. At the end of the time slot for the located trunk, the signal end detector 891 delivers a pulse to reset the recall Flip-Flop 875. This restores the link talk path to a normal level. Reconnect occurs in a similar manner using AND gate 893.

More specifically, referring to circuit block 900 in FIG. 2, split and reconnect occurs as a result of signals appearing on these respective highways 859 or 861 during the time slots for this trunk. These signals are generated in the link 30 which is used in connection with this call and in connection with the locate feature already described. If split is desired, a low will appear on split highway 859 during the time slot for this trunk. The simultaneous occurrence of two lows at the input to NOR 863 causes output to go high momentarily. This high then causes the output of NOR 899 to go low momentarily so that the output of NOR-897 goes high. Then the flip-flop 867 consisting of NOR 897 and 899 energizes inverter 869 causing its output to go low. This pulls in the relay 871 which connects the interconnect unit to resistor 893 rather than the input winding of transformer 895. The trunk is now in a split condition and will remain this way until it is subsequently reconnected. Reconnect occurs when a low appears on the reconnect highway 861. A simultaneous occurrence of two lows at the input to NOR-802 causes its output to go high. By inverter action of NAND-804, this causes a low to occur at the left input of NAND-806 causing its output to go high. This high then drives the output of NOR-897 low which resets the Flip-Flop 867. When the output of NOR-897 is low, the inverter 869 releases the split relay so that the normally closed contacts are reconnected cutting the trunk through into the Central Office.

Referring to FIG. 4, the split and reconnect function is controlleld by Flip-Flop 885 which has a high tied to both the J and the K leads so that each subsequent clock pulse causes the flip-flop 885 to alternate from a one to a zero state. The clock lead of Flip-Flop 885 is controlled by the output of NOR-881. The upper input to NOR-881 is normally in a low condition. The lower input comes from NOR-Z1. If recall is signalled, a low will appear on the Q outut of the recall flip-flop 875 then appears at the lower lead of NOR-Z1. If a trunk is connected to this link, a low will appear at the output of NOR-Q1 so that both inputs to NOR-Z1 are low. This will cause a high to appear at the output of NOR-Z1 which then clocks the split Flip-Flop 885.

When the link was initially idle, the split Flip-Flop 885 was placed in a reset condition by the R lead which is connected to link busy which was at that time low. Therefore, initially the split Flip-Flop 885 is in zero condition, where the Q output is high and the Q output is low. When split is indicated, the Q output goes high and the Q output goes low. At this time, both inputs to NOR-S3 are low, causing its output to go high. This high then appears at the input to NOR-S2 so that its output goes low which causes a high to appear at the output of inverter S1 which drives transitor Q3 into saturation. Transistor Q3 is driven very deeply into saturation, owing to the large base drive current supplied through resistor R17. This forces the link talk path 172 to assume a low condition. When the scanner encounters the line which has its talk path shorted to ground, a high will appear on the locate highway 857. This high will then supply a corresponding level to the lower lead of NAND-AB02. The upper lead of NAND-AB-2 is already high as a result of the output from NOR-S3. The center lead of NAND-AB-2 will also be high at this time if the circuit being located is actually a trunk. The center lead is connected to the trunk highway by double inversion action of inverter AL-2 and AL-1. When three simultaneous highs occur at the inputs NAND-AB02, its output goes low which causes a high to appear at the output of inverter AL-4 by iunverter action. This energizes the split highway 859 through diode CR-24 causing the trunk which is connected to this link to be placed into a plit condition as described with reference to FIG. 2.

The output of inverter AL-4 supplies a high to inverter H2 causing its output to go low. This sets Flip-Flop 873 so that a register request occurs. The originator who flashed his hook switch has now split himself from the trunk and has requested a register and will be receiving dial tone as soon as the register is connected. When the split highway 859 was energized, a low appeared at the output of NAND-AB02 which caused a high to appear at the output of NAND-J4 during the time slot of the trunk which was being split. This high then appeared at the input to NOR-BA01 causing its output to go low. A short time later as dictated by resistor R55 and capacitor C20, the upper input to NOR-BA-2 will go low. Since a high is present at the input to NOR-BA-3, its output will also be low causing a high to appear at the output of NOR-BA-2 which by feedback action then appears at the input to NOR-BA-3. When the trunk time slot has terminated, the output of NAND-J4 will again go low causing the output of NOR-BA-1 to go high since both of its inputs are presently low. When capacitor C20 has sufficient time to change, a high will occur at the input to NOR-BA-2 causing its outpout to go low so that both inputs are low at NOR-DA-3 causing its output to go high which then supplies a high to NOR-BA-1. This then causes the output of NOR-BA-1 to revert back to a low again. Therefore, during the discharge time of capacitor C20, a high prevailed at the center input of NOR-AQ-3 causing its output to go low which reset the recall flip-flop 875. This then disabled the split function which was previously set up.

When the hook switch is subsequently operated, reconnect is required. The recall flip-flop 875 is clocked into a set condition as described previously. The resultant high on the Q lead and low on the Q lead again causes the split flip-flop 885 to be clocked. Now the split flip-flop 875 is clocked back into the reset condition so that its output Q goes low and Q goes high. This causes two lows to appear at the input to NOR-S4 so that this output goes high which supplies a corresponding level to input 808 of NOR-S2 so that its output goes low, so that the output of NOR-S1 goes high, causing transistor Q3 to be driven into saturation to short out the link talk path 172 again. When this scanner encounters the trunk which is connected to this link, three simultaneous highs will occur at the inputs to NAND-AB03 causing its output to go low. A high will then appear on the reconnect highway 861 by the inverting action of inverter AL-5 and coupling diode CR-25. The low which appeared at the output of NAND-AB-3 then causes a high to appear from NAND-J4 as described previously which will then subsequently reset the recall flip-flop 875 as was done for the split condition. In this case, the register request flip-flop 873 is not set.

Thus, PBX 10 can easily perform a split or reconnect upon demand of the users.

DIAL THRU CIRCUITS

In a telephone switching system, it is desirable to allow station users to dial, with a rotary dial phone, through the switchboard into the public network without attendant assistance. Because of line balance and common batter requirements, a line transformer is normally connected to the tip and ring pair. The line transformer will not pass dial pulses which are very low in frequency (8 to 12 IPS) and it is not reasonable to make a transformer that would pass these pulses. Also, it is essential for proper operation of the system that the duty cycle of the dial pulses be maintained as well as the frequency. Elaborate interconnect circuits (shaping and reforming circuits) are in use in many present systems which, in effect, attempt to regenerate the pulses so they can be properly identified by the central office equipment. PBX 10 provides this dial through capability without the need for an interconnect device. In PBX 10, dial pulses are sent from the station loop side to the unbalanced side (crosspoint side) of the line transformer by logic circuits which feed the pulses around the transformer. It will be recognized that if only "touch tone" types of phones are to be used, this circuitry is not required.

Figure 13:
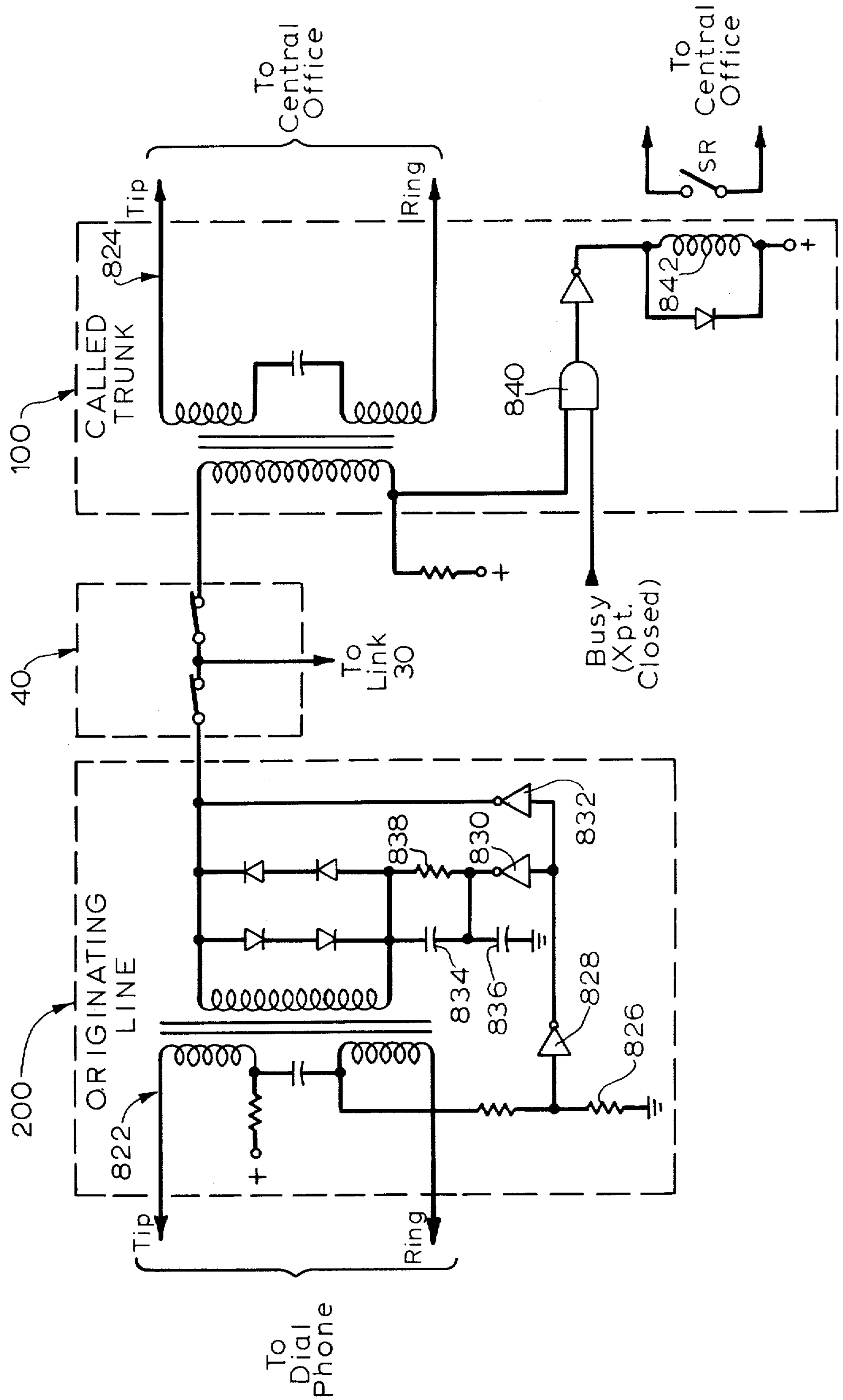
FIG. 13 is a block schematic diagram of a circuit for enabling the use of a rotary dial phone with telephone switching system shown in FIG. 1.

FIG. 13 is a schematic block diagram depicting the dial through function of PBX 10. As shown in FIG. 13, one portion of the dial circuitry 820 may be found in the line circuit 200 shown in FIG. 3, the trunk circuit 100 shown in FIG. 2 and the crosspoint matrix 40 shown in FIG. 1.

Once the originating station 700 dials the outgoing access code (termination number) for the desired trunk 100, a through concentration is established. The unbalanced talk path 822 of the calling line 100 is connected to the unbalanced talk path 824 of the outgoing trunk 100 on a metallic basis through intervening crosspoints 40. Therefore, highs and lows generated for the line commensurate with dialing will appear also at the trunk.

The presence or absence of loop current is detected as a high or low appearing across current sensing resistor 826. When loop current is flowing a low then appears at the output of inverter 828 causing a high to occur at the outputs of inverters 830 and 832. Inverter 832 merely opens in this case so as not to attenuate audio signals during conversation.

Inverter 830 pulls the talk path high at this time by rapidly charging the associated AC bypass capacitors 834 and 836. The resistor 838 allows dialing to occur even if two or more lines are connected to a trunk and this is done on a compromise basis. When the loop opens as during dialing, the outputs of inverters 830 and 832 both go low. Inverter 832 helps to rapidly attenuate transients which would otherwise cause ringing (inductive) and the like to appear on the unbalanced talk path. The result is that dial pulses which truly represent the dialing mechanism duty cycle and rate appear on the crosspoint talk path 40 and thus the outgoing trunk 100.

For the interconnect trunk 100 the dial pulses will appear at the output of AND gate 840 causing operation of ralay 842 commensurate with the dialing. Contacts on relay 842 then provide dialing signals to the central office through the service request leads described above for conventional calls.

KEY LINE

Figure 14:
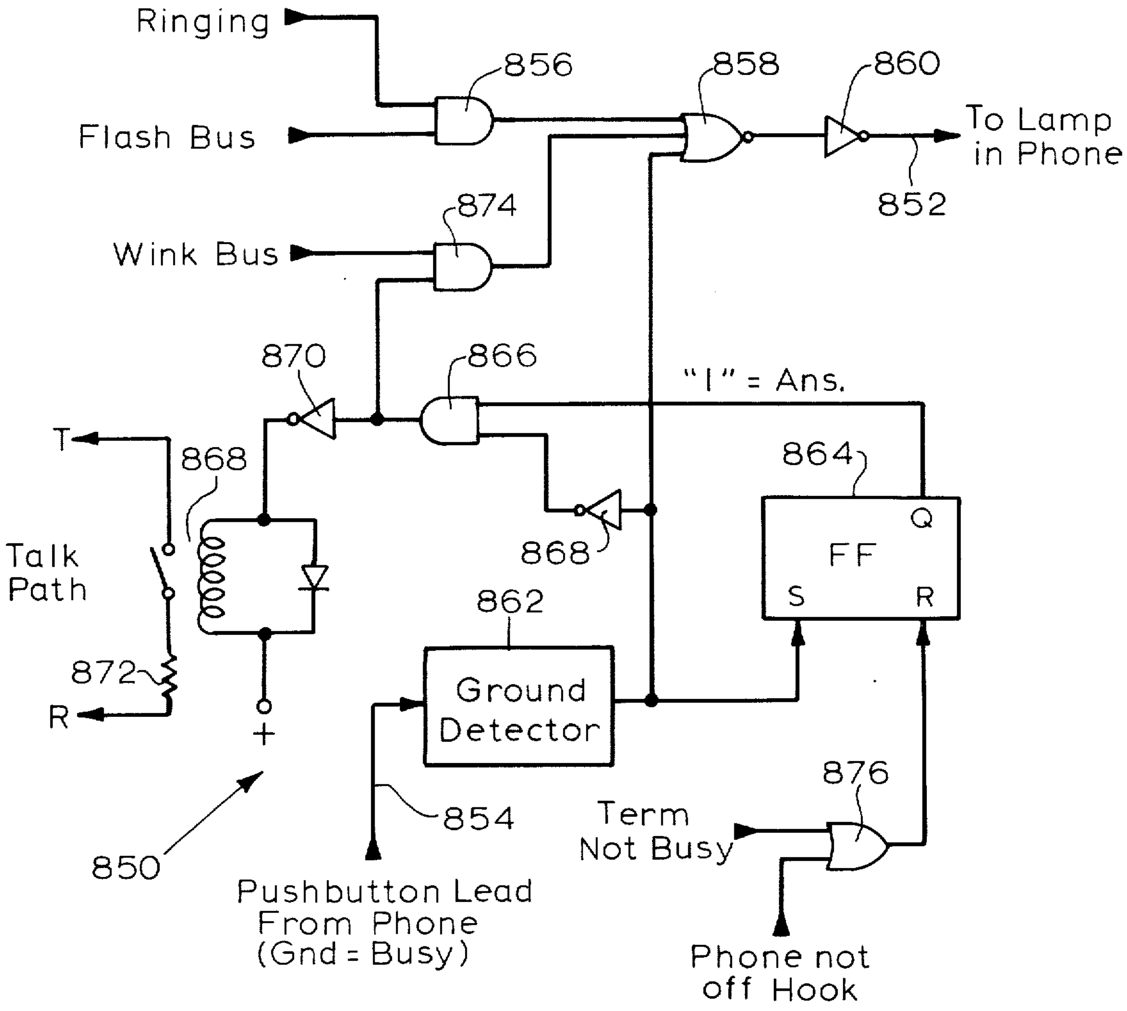
FIG. 14 is a block schematic diagram of the key line circuit.

Referring to FIG. 14, Key Line circuit 850 enables the use of multi-line telephone subsets having hold and lighted line selector pushbuttons without the use of separate interconnect equipment between the phone and the switchboard for generating signals such as busy, ringing, etc.

Key Line circuit 850 is very similar to line circuit 200 (FIG. 3) except that two additional control leads are provided; lamp lead 852 and pushbotton lead 854. Lamp lead 852 causes a lamp or lamps in the subset to "flash" during ringing, glow constantly when off hook, and "wink" while hold. The pushbutton lead 854 is controlled by a pushbutton or pushbuttons associated with this line. To seize the line, the pushbutton lead 854 must be grounded. If the phone loop (Tip & Ring) is open and the lead 854 is grounded, release is signalled as at the end of conversation when the phone is hung up. If the lead 854 is not grounded and the call was answered, a hold condition occurs.

If ringing is indicated, the phone users must be informed as to which line is ringing and this is done by flashing the associated lamp. When ringing is in process, a sustained high generated by other logic in the line (FIG. 3) will appear at the upper input to AND gate 856. Outputs will occur from AND gate 856 commensurate with the flash bus pulsing. AND gate 856 then drives OR gate 858 and Inverter 860 which supplies momentary ground signals to the lamp lead 852 at the flashing rate.

When a station user answers or originates a call, he depresses the key associated with this line supplying a ground on the pushbutton lead 854 which is detected by ground detector 862 which drives OR gate 858 causing the lamp to glow on a sustained basis. Ground Detector 862 also sets Flip-Flop 864 causing a high to appear on the associated Q lead which identifies this call as having been answered.

If the station user elects to place the line on hold, he depresses the hold button which removes ground from the pushbutton lead 854 while maintaining loop closure (accomplished in the phone subset). This condition causes a high to appear at the output of AND 866 since the output of Detector 862 is low causing the output of Inverter 868 to be high and since the Q output of Flip-Flop 864 is high. AND gate 866 then energizes the hold relay 868 via Inverter 870 which grounds one end of the coil. This places resistor 872 across tip and ring to maintain loop current after the station user releases the hold key (removes finger). AND gate 866 also supplies a 1 to the lower input of AND gate 874 causing the lamp to wink. Finally, OR gate 876 resets Flip-Flop 864 when the termination becomes idle (no crosspoint closed) or the phone is not off hook as during ringing or when idle.

RING GENERATING CIRCUIT

As shown in FIG. 1, PBX 10 utilizes a circuit 10 for ring generating no arc ring control which is common to the entire PBX 10. The purpose of ring generating circuit 10 is to develop timed signals to energize ring relays and to interrupt the ring generator so that arcing does not occur on the ring relay contacts during either pickup or dropout.

Figure 15:
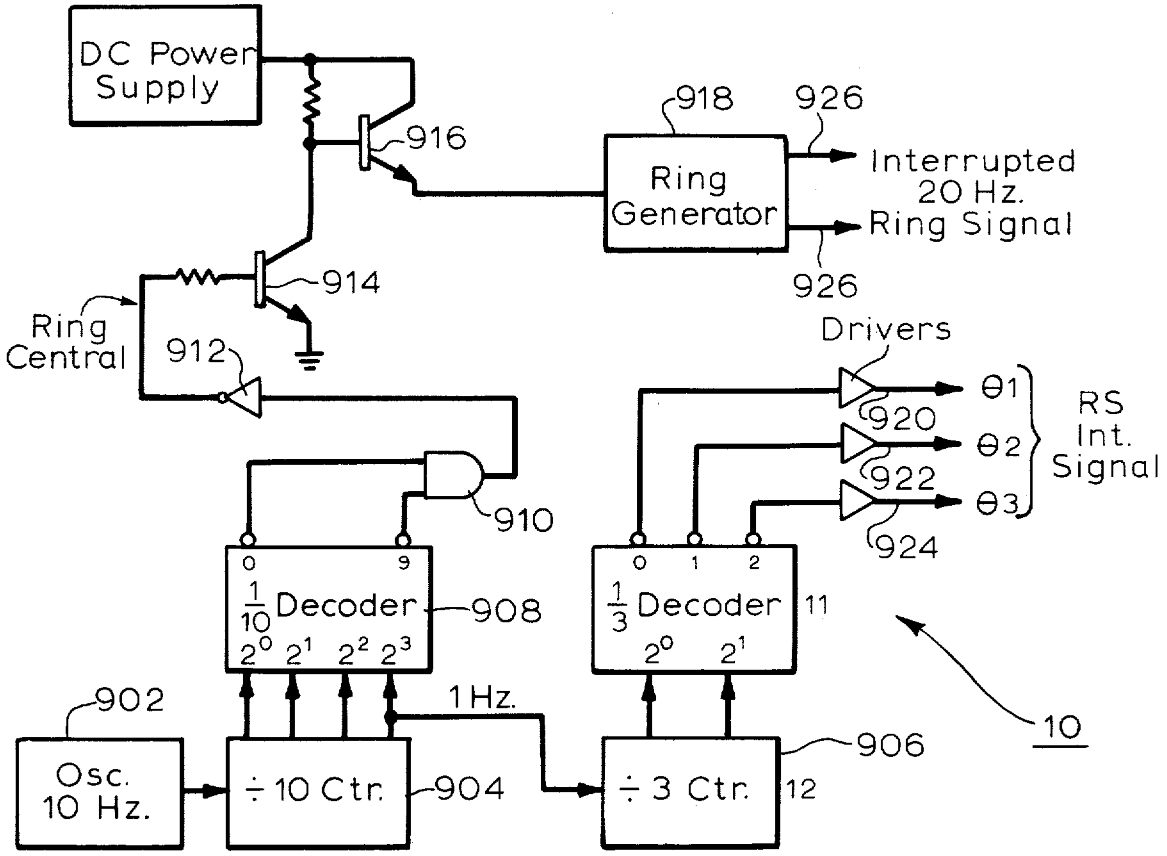
FIG. 15 is a block schematic diagram of an improved circuit for generating no arc ring control.

Referring to FIG. 15, ring generating circuit 10 comprises an oscillator 902 which runs at a frequency approximately 10 Hz drives divide by 10 counter 904 which delivers a carry signal to counter 906 at a 1 Hz rate. Counter 906 is arranged to divide by 3 which establishes three phases of ringing delivered on leads 920, 922 and 924. Each phase services approximately one third of the total lines in PBX 10 so that the ring generator power is more effectively utilized. Any conventional counters may be utilized.

During counts of 0 and 9 in counter 904, the outputs of decoder 908 are low. A count of 9 occurs just prior to carry and 0 occurs just after carry. Carry occurs the instant the ring relays are energized or de-energized and it takes place as counter 908 steps from 9 to 0. During the counts of 9 and 0 one of the inputs to AND gate 910 is low so that its output is low resulting in a high appearing at the output of invertor 912. This high then drives transistor 914 into saturation so that essentially 0 base voltage appears on emitter follower transistor 916 which supplies DC power to the ring generator 918. Thus, during the count of 0 or 9, the ring generator 918 is turned off. This time is just prior to dropout (9) or pickup (0) of the ring relays. Thus, common interruption of the ring generator is done with power transistors 914 and 916 rather than mechanical contacts thereby improving reliability.

Each of the terminations 12 which comprise line circuits 200 all include a ring control circuit 20 (FIG. 1). The ring control circuit 20 operates in conjunction with ring generating circuit 10 (FIG. 15) and its operation will be explained with reference to FIG. 16.

Figure 16:
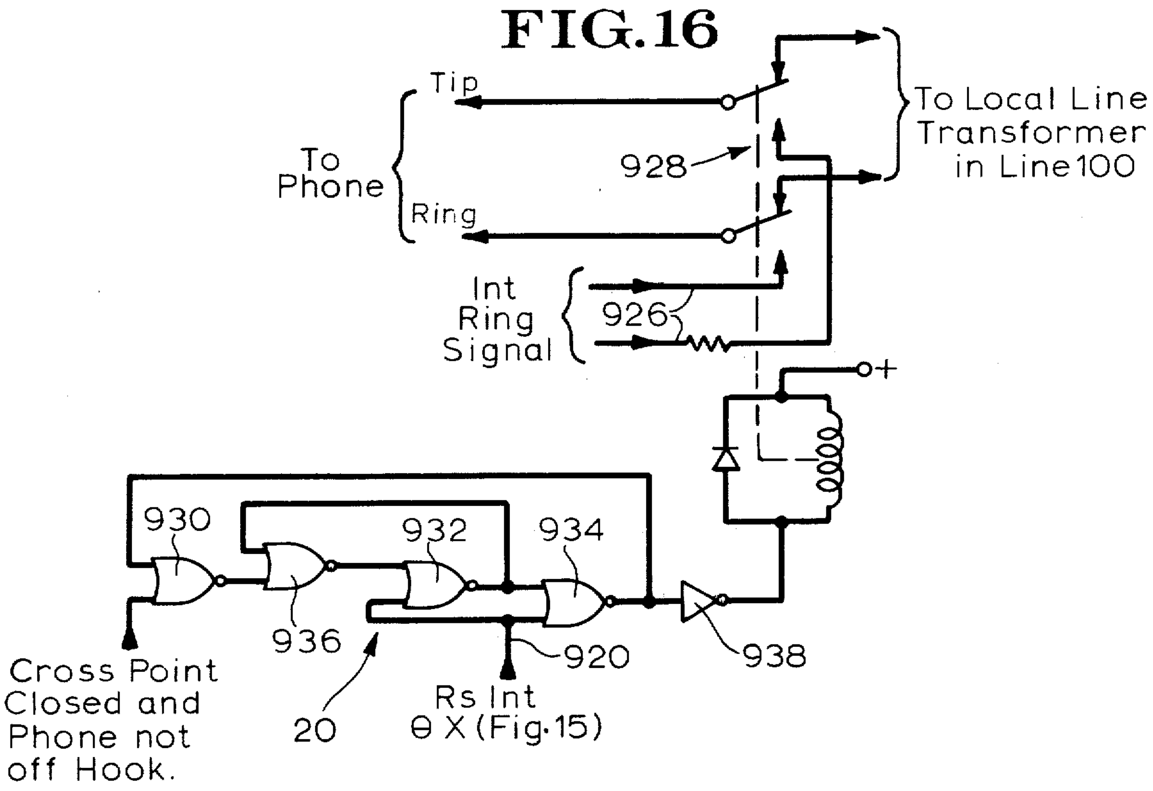
FIG. 16 is a schematic diagram of an improved line circuit for transmitting no arc ring signal.

Referring now to FIG. 16, ring control circuit 20 comprises a double pole double throw relay 926 connects the tip and ring pair of the desired phone to the ring generator 910 (FIG. 15) rather than the local line transformer during ring bursts. Two inputs control operation of the ring relay 928. The lower input to NOR gate 930 is low when ringing is desired which corresponds to a logic situation where a crosspoint associated with this termination is closed and the phone associated with this termination is on hook. Actual timing of the ringing is controlled by the RS interrupt bus leads 920, 922, or 924 (FIG. 15) connected to the lower inputs of NOR gates 932 and 934. This is timed relative to the interrupted ring signal by common circuits. NOR gates 930, 932, 934 and 936 insure that partial ring bursts are not sent since timing between their imputs is asynchronous.

The ring relay 928 is energized when a high level appears at the input to inverter 938 causing its output to go low which then energizes the relay coil 928. A high appears at the input to inverter 938 when both inputs to NOR gate 934 are low. The lower input to NOR gate 934 controls ring timing as described previously and is low for approximately 1 second and high for 2 seconds. The upper input to NOR gate 934 comes from the RS flip-flop formed by NOR gates 932 and 936. Each time RS INT on lead 920 goes high (between ring bursts) the output of NOR gate 932 is forced low (reset) and this low appears at the upper input to NOR gate 936. The lower input to NOR gate 936 will also be low if ringing is desired for the next burst, owing to the high which would then be present at the lower input to NOR gate 930. The output of NOR gate 936 will then be high (set) so that when RS INT goes low both inputs to NOR gate 934 will be low causing ringing to occur. This insures that the start of ringing is a consequence of RS INT on lead 920, 922 or 924 (FIG. 15) rather than the lower input to NOR gate 930. If RS INR Is already low when the lower input to NOR gate 930 goes high ringing will not start on this burst because the output of NOR gate 932 is already high.

Feedback from NOR gate 934 to NOR gate 930 insures that the trailing edge of each ring burst is a consequence of RS INT and not the lower input to NOR gate 930. This logic is included as a safety interlock rather than an essential element since a closure cannot be detected during ring anyway since the ring relay disconnects (transfer) the closure detector from the station loop at this time. Once the output of NOR gate 934 goes high the output of NOR gate 930 is forced to remain low in spite of any changes on the lower input which might occur. The overall effect of this logic is to insure that ringing always results in a full duration timed burst as determined by RS INT regardless of when the line becomes busy and requests ringing or when the called party answers.

It will be recognized that the schematic diagrams disclosed herewith represent only one illustrative embodiment of the invention and that while various component values and tye numbers have been depicted, these values and types are exemplary and are merely illustrative of the invention. Obviously, many modifications and variations may be made without departing from the spirit and scope of the invention.

I claim:

1. In a telephone switching system having a crosspoint matrix of horizontal and vertical terminal dimensions N by M, respectively, with the matrix crosspoint at the intersection of respective horizontal and vertical terminal pairs being adapted for effecting an electrical interconnection of said respective terminal pairs in response to coincident signal markings thereon and further having N termination circuits and M normally idle link circuits coupled to individual ones of said horizontal and vertical terminals, respectively, of said matrix, the combination comprising:

a plurality of register means associated with said link circuits;

scanner means for signal markings the horizontal terminal of a first predetermined member of said N termination circuits;

allotter means for enabling an idle one of said M link circuits to signal mark its associated vertical matrix terminal and for completing an electrical connection to said horizontal terminal of said first predetermined member of said N termination circuits;

means responsive to said link circuit signal mark for electrically connecting one of said register means to selected link circuit and for supplying a dial tone to said predetermined member of said N termination circuits to enable said predetermined member of said N termination circuits to dial, and whereby said connected register means is responsive to said dialing;

a first control circuit means connecting each of said M link circuits to each of said N termination circuits, wherein said first control circuit means supplies individual identification data relating to each of said N termination circuits to said M link circuits;

a second control means connecting each of said N termination circuits to each of said M link circuits whereby said connected register means energizes said second control circuit means associated with a second member of said predetermined N termination circuits in response to said dialing thereby signal marking the horizontal terminal of said second predetermined member of said N termination circuits, whereby said second predetermined member of said N termination circuits is connected to said first predetermined member of said N termination circuits through said previously connected vertical matrix terminal; and conference circuit means associated with said register means for connecting a preselected number of said termination circuits together along a single vertical matrix terminal.

2. The telephone switching system of claim 1 wherein said connected register means transfers said dialing information from said predetermined member of said N termination circuits to said selected link circuit whereby said connection to said register means is disconnected thereby enabling said register means to receive link circuit signal marks from another of said links.

3. The telephone switching system of claim 1 further comprising:

attendant access means for enabling an attendant to have access to any of said N termination circuits through said preselected link circuit and wherein certain preselected members of said N termination circuits may be connected to the other of said N termination circuits only by said attendant.

4. The telephone switching system of claim 3, wherein at least one of said N termination circuits comprises a trunk circuit and wherein another of said N termination circuits comprises a preselected line circuit, further comprising:

direct access circuit means connected to said plurality of register means wherein said direct access circuit means is responsive to said data from said first control circuit means and enables a circuit to be completed between said trunk circuit and said preselected line circuit automatically, thereby bypassing said attendant access means.

5. The telephone switching system of claim 4 further comprising means for connecting said trunk circuit to a plurality of said preselected line circuits automatically, thereby bypassing said attendant access means.

6. The telephone switching circuit of claim 4 further comprising:

third control means associated with said register means for automatically connecting one of said trunk circuits to one of said line circuits and wherein said line circuit may be selectively connected to others of said termination circuits when not connected to said trunk circuit.

7. The telephone switching system of claim 6 wherein said third control means comprises:

patch means for identifying said trunk circuit and said line circuit which are to be automatically connected;

means for conveying a signal to a third control circuit indicative of a request for service from said trunk circuit; and means for conveying said identification for said line circuit to said associated register means wherein said register means causes one of said link circuits to complete a path from said line circuit to said trunk circuit only where a signal appears on said third control circuit.

8. The telephone switching system of claim 1 further comprising:

restrictor circuit means connected to said plurality of register means wherein said restrictor circuit means monitors said dialing by said preselected member of N termination circuits, and in response to said data from said first control circuit means automatically disconnects said preselected member of said N termination circuits upon a preselected occurrence.

9. The telephone switching system of claim 8 wherein said restrictor circuits means monitors only a portion of said dialing by said preselected member of said N termination circuits.

10. The telephone switching system of claim 9 wherein said restrictor circuit means comprises patching circuit means associated with preselected members of said N termination circuits.

11. The telephone switching system of claim 1 further comprising:

an interrupting means for temporarily interrupting a circuit connection between a first and second member of said N termination circuits for connecting said first member to a third member of said N termination circuits, and for reconnecting said first member to said second member in response to a preselected signal generated by said first member.

12. The telephone switching system of claim 10 wherein said interrupting means comprises:

means for identifying said second member;

means for disconnecting said second member; and means for connecting said third member to said first member for reconnecting said second member to said first member.

13. The telephone switching system of claim 11 wherein said interrupting means comprises:

means for placing a signal on the talk path associated with said first and said second member;

means responsive to said signal on said talk path for disconnecting said second member from said first member and for providing a dial tone to said first member to enable said first member to obtain a connection to said third member; and means for reconnecting said second member to said first member.

14. The telephone switching circuit of claim 1 further comprising:

key means for enabling at least two of said termination circuits to be directly connected to a multi-line telephone.

15. The telephone switching system of claim 1 wherein said first control means comprises a patch means associated with each of said termination circuits wherein said patch means provides said individual identification data.

16. The telephone switching system of claim 1 further comprising:

ring generator means; and solid state circuit means for energizing said ring generator means for interrupting the energization of said ring generator means without causing arcing.

17. The telephone switching circuit of claim 16 wherein said solid state circuit means comprises:

transistor means in circuit with said ring generator means;

counter means for intermittently energizing said transistor means whereby said ring generator means generates an intermittent ring signal; and means for selectively transmitting said intermittent ring signal to a telephone receiver only when said telephone receiver is not off-hook.

18. The telephone switching system of claim 1 wherein at least one of said termination circuits comprises a trunk circuit and wherein another of said termination circuits comprises a line circuit having a rotary dial telephone connected thereto whereby said rotary dial telephone generates loop current commensurate with dialing, further comprising:

means for detecting the presence and absence of loop current and for generating a first signal indicative of the presence of loop current and a second signal indicative of the absence of loop current; and means for transmitting said first and second signals to said trunk circuit through said matrix connection.

19. The telephone switching system of claim 4 wherein said direct access circuit means further comprises:

a first means responsive to said first control means for disabling said attendant access means in response to a signal representative of an incoming call from one of said trunk circuits and for connecting one of said register means to said trunk circuit through one of said link circuit means;

second means for automatically providing information to said connected register means, said information being representative of said preselected line circuit; and third means for transferring said information from said connected register means into said link circuit means whereby said trunk circuit is automatically connected to said preselected line circuit.

20. The telephone switching system of claim 19 wherein said first means comprises a flip-flop means and wherein said second means comprises a counter means.

21. In a telephone switching system having a crosspoint matrix of horizontal and vertical terminal dimensions N by M, respectively, with the matrix crosspoint at the intersection of respective horizontal and vertical terminal pairs being adapted for effecting an electrical interconnection of said respective terminal pairs in response to coincident signal markings thereon and further having N termination circuits and M normally idle link circuits coupled to individual ones of said horizontal and vertical terminals, respectively, of said matrix, and wherein at least one of said N termination circuits comprises a trunk circuit and wherein another of said N termination circuits comprises a preselected line circuit, the combination comprising:

scanner means for signal marking the horizontal terminal of a first predetermined line circuit member of said N termination circuits;

allotter means for enabling an idle one of said M link circuits to signal mark its associated vertical matrix terminal and for completing an electrical connection to said horizontal terminal of said first predetermined line circuit member of said N termination circuits;

a plurality of register means associated with said link circuits;

means responsive to said link circuit signal mark for electrically connecting one of said register means to said selected link circuit and for supplying a dial tone to said predetermined line circuit member of said N termination circuits to enable said predetermined line circuit member of said N termination circuits to dial information representative of a second preselected termination member and whereby said connected register means is responsive to said dialing;

means for transferring said dialing information from said connected register means into said link circuit thereby signal marking the horizontal terminal of said second predetermined member of said N termination circuits, whereby said second predetermined member of said N termination circuits is connected to said first predetermined line circuit member of said N termination circuits through said previously connected vertical matrix terminal; and conference circuit means associated with said register means for connecting a preselected number of said termination circuits together along a single vertical matrix terminal.

22. The telephone switching system of claim 21 further comprising:

attendant access means for enabling an attendant to have access to any of said N termination circuits through said preselected link circuit and wherein certain preselected trunk members of said N termination circuits may be connected to the other of said N termination circuits only by said attendant.

23. The telephone switching system of claim 22 further comprising:

a first control circuit means connecting each of said M link circuits to each of said N termination circuits, wherein said second control circuit means supplies individual identification data relating to each of said N termination circuits to said M link circuits; and direct access circuit means connected to said plurality of register means wherein said direct access circuit means is responsive to said data from said first control circuit means and enables a circuit to be completed between said one of said preselected trunk circuits and said one of said preselected line circuits automatically bypassing said attendant access means.

24. The telephone switching system of claim 23 wherein said direct access circuit means further comprises:

a first means responsive to said first control means for disabling said attendant access means in response to a signal representative of any incoming call from said preselected trunk circuit and for connecting one of said register means to said trunk circuit through one of said link circuit means;

second means for automatically providing information to said connected register means, said information being representative of said preselected line circuit; and third means for transferring said information from said connected register means into said link circuit means whereby said trunk circuit is automatically connected to said preselected line circuit and whereby said register means is disconnected from said link circuit.

25. The telephone switching system of claim 24 further comprising means for connecting said preselected trunk circuit to a plurality of said preselected line circuits automatically, thereby bypassing said attendant access means.

26. The telephone switching system of claim 21 wherein said connected register means transfers said dialing information from said predetermined member of said N termination circuits to said selected link circuit whereby said connection to said register means is disconnected thereby enabling said register means to receive link circuit signal marks from another of said links.

27. The telephone switching circuit of claim 23 further comprising:

second control means associated with said register means for automatically connecting one of said trunk circuits to one of said line circuits and wherein said line circuit may be selectively connected to others of said termination circuits when not connected to said trunk circuit.

28. The telephone switching system of claim 27 wherein said second control means comprises:

patch means for identifying said trunk circuit and said line circuit which are to be automatically connected;

means for conveying a signal to a second control circuit indicative of a request for service from said trunk circuit; and means for conveying said identification for said line circuit to said associated register means wherein said register means causes one of said link circuits to complete a path from said line circuit to said trunk circuit only when a signal appears on said third control circuit.

29. The telephone switching system of claim 1 further comprising:

restrictor circuit means connected to said plurality of register means wherein said restrictor circuit means monitors dialing by preselected line circuit members of said N termination circuits, and in response to said data from said first control circuit means automatically disconnects said preselected line member of said N termination circuits upon a preselected occurrence.

30. The telephone switching system of claim 23 further comprising:

restrictor circuit means connected to said plurality of register means wherein said restrictor circuit means monitors dialing by preselected line circuit members of said N termination circuits, and in response to said data from said first control circuit means automatically disconnects said preselected line member of said n termination circuits upon a preselected occurrence.

31. The telephone switching system of claim 30 wherein said restrictor circuit means monitors only a portion of said dialing by said preselected member of said N termination circuits.

32. The telephone switching system of claim 21 further comprising:

an interrupting means for temporarily interrupting a circuit connecteion between a first and second member of said N termination circuits for connecting said first member to a third member of said N termination circuits, and for reconnecting said first member to said second member in response to a preselected signal generated by said first member.

33. The telephone switching system of claim 30 further comprising:

an interrupting means for temporarily interrupting a circuit connection between a first and second member of said N termination circuits for connecting said first member to a third member of N termination circuits, and for reconnecting said first member to said second member in response to a preselected signal generated by said first member.

34. The telephone switching system of claim 33 wherein said interrupting means comprises:

means for identifying said second member;

means for disconnecting said second member; and means for connecting said third member to said first member and for reconnecting said second member to said first member.

35. The telephone switching system of claim 33 wherein said interrupting means comprises:

means for placing a signal on the talk path associated with said first and second member;

means responsive to said signal on said talk path for disconnecting said second member from said first member and for providing a dial tone to said first member to enable said first member to obtain a connection to said third member; and means for reconnecting said second member to said first member.

36. The telephone switching circuit of claim 21 further comprising:

key means for enabling at least two of said termination circuits to be directly connected to a multi-line telephone.

37. The telephone switching system of claim 21 further comprising:

ring generator means; and solid state circuit means for energizing said ring generator means and for interrupting the energization of said ring generator means without causing arcing.

38. The telephone switching circuit of claim 37 wherein said solid state circuit means comprises:

transistor means in circuit with said ring generator means;

counter means for intermittently energizing said transistor means whereby said ring generator means generates an intermittent ring signal; and means for selectively transmitting said intermittent ring signal to a telephone receiver only when said telephone receiver is not off-hook.

39. The telephone switching system of claim 21 wherein at least one of said termination circuits comprises a trunk circuit and wherein another of said termination circuits comprises a line circuit having a rotary dial telephone connected thereto whereby said rotary dial telephone generates loop current commensurate with dialing, further comprising:

means for detecting the presence and absence of loop current and for generating a first signal indicative of the presence of loop current and a second signal indicative of the absence of loop current; and means for transmitting said first and second signals to said trunk circuit through said matrix connection.

* * * * *